(12) United States Patent
Höglund et al.

(10) Patent No.: US 12,402,118 B2
(45) Date of Patent: Aug. 26, 2025

(54) SUPPORT FOR TRANSMISSION IN PRECONFIGURED UL RESOURCES

(71) Applicant: Telefonaktiebolaget LM Ericsson (publ), Stockholm (SE)

(72) Inventors: Andreas Höglund, Solna (SE); Hazhir Shokri Razaghi, Solna (SE); Sandeep Narayanan Kadan Veedu, Täby (SE); Johan Bergman, Stockholm (SE); Gerardo Agni Medina Acosta, Märsta (SE); Tuomas Tirronen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1042 days.

(21) Appl. No.: 17/280,314

(22) PCT Filed: Sep. 27, 2019

(86) PCT No.: PCT/IB2019/058252
§ 371 (c)(1),
(2) Date: Mar. 26, 2021

(87) PCT Pub. No.: WO2020/065619
PCT Pub. Date: Apr. 2, 2020

(65) Prior Publication Data
US 2022/0007391 A1    Jan. 6, 2022

Related U.S. Application Data

(60) Provisional application No. 62/737,786, filed on Sep. 27, 2018.

(51) Int. Cl.
*H04W 72/1268*    (2023.01)
*H04W 72/21*    (2023.01)

(52) U.S. Cl.
CPC ....... *H04W 72/1268* (2013.01); *H04W 72/21* (2023.01)

(58) Field of Classification Search
CPC .......................... H04W 72/1268; H04W 72/21
See application file for complete search history.

(56) References Cited

U.S. PATENT DOCUMENTS

| 10,178,592 B2 | 1/2019 | Yang |
| 12,004,204 B2 * | 6/2024 | Shin ................. H04W 56/0055 |

(Continued)

FOREIGN PATENT DOCUMENTS

| CN | 102571297 A | 7/2012 |
| CN | 103314623 A | 9/2013 |

(Continued)

OTHER PUBLICATIONS

Ericsson, "Fixing UE power efficienty", SA WG2 Meeting #128BIS, S2-188438, (revision of S2-187782), Sophia Antipolis, France, Aug. 20-24, 2018, 1-12.

(Continued)

*Primary Examiner* — Michael J Moore, Jr.
(74) *Attorney, Agent, or Firm* — Murphy, Bilak & Homiller, PLLC

(57) ABSTRACT

Techniques for facilitating dedicated transmissions over preconfigured uplink resources. Embodiments include techniques to configure subsequent PUR resource utilization (e.g., one-at-a-time basis or on a periodic basis), changes to EDT signaling to allow functioning with PUR, etc. An example method performed by a wireless device configured for use in a wireless communication network includes transmitting (90), in an uplink message, a request for a configuration of preconfigured uplink resources. The method further includes receiving (100), during a connected mode in which the wireless device has a connection with the (Continued)

wireless communication network, control signaling indicating a first preconfigured resource configuration that configures a first preconfigured resource. The method also includes transmitting or receiving (120) user data using the first preconfigured resource.

32 Claims, 17 Drawing Sheets

(56)         References Cited

U.S. PATENT DOCUMENTS

| | | |
|---|---|---|
| 2007/0254656 A1 | 11/2007 | Dalsgaard |
| 2012/0033613 A1 | 2/2012 | Lin et al. |
| 2012/0307821 A1 | 12/2012 | Kwon et al. |
| 2013/0021979 A1 | 1/2013 | Kwon et al. |
| 2013/0100938 A1 | 4/2013 | Kwon et al. |
| 2013/0188516 A1* | 7/2013 | He .......................... H04L 5/14 370/254 |
| 2013/0279482 A1 | 10/2013 | Sundberg et al. |
| 2013/0301446 A1 | 11/2013 | Chen et al. |
| 2014/0314057 A1 | 10/2014 | Van Phan et al. |
| 2016/0227503 A1 | 8/2016 | Dalsgaard et al. |
| 2016/0242133 A1 | 8/2016 | Venkob et al. |
| 2017/0215188 A1* | 7/2017 | Kim ...................... H04L 5/0091 |
| 2017/0303240 A1 | 10/2017 | Basu Mallick et al. |
| 2018/0199381 A1 | 7/2018 | Rong et al. |
| 2018/0227887 A1* | 8/2018 | Hakola ................ H04B 7/0695 |
| 2018/0376422 A1* | 12/2018 | Shu .................... H04W 52/0235 |
| 2019/0037425 A1 | 1/2019 | Hong et al. |
| 2019/0053158 A1 | 2/2019 | Kumar et al. |
| 2019/0053182 A1 | 2/2019 | Choi et al. |
| 2019/0082408 A1 | 3/2019 | Kim et al. |
| 2019/0174398 A1 | 6/2019 | Geng et al. |
| 2019/0261233 A1* | 8/2019 | Duan ................ H04W 36/0066 |
| 2019/0289502 A1* | 9/2019 | Abedini ............ H04W 72/0446 |
| 2020/0107283 A1 | 4/2020 | Ratasuk et al. |
| 2020/0107396 A1 | 4/2020 | Wang et al. |
| 2020/0169873 A1 | 5/2020 | Ding et al. |
| 2020/0196264 A1 | 6/2020 | Shih et al. |
| 2021/0014864 A1* | 1/2021 | Phuyal .................. H04W 72/23 |
| 2021/0068132 A1 | 3/2021 | Wang et al. |
| 2021/0274555 A1 | 9/2021 | Alfarhan et al. |
| 2021/0289463 A1 | 9/2021 | Bi et al. |
| 2021/0297976 A1 | 9/2021 | Medina Acosta et al. |
| 2021/0298108 A1 | 9/2021 | Wu et al. |
| 2021/0306968 A1 | 9/2021 | Liberg et al. |
| 2021/0345395 A1 | 11/2021 | Chatterjee et al. |
| 2021/0360730 A1* | 11/2021 | Kim .................. H04W 74/0833 |
| 2021/0385835 A1* | 12/2021 | Medina Acosta .......................... H04W 72/1268 |
| 2021/0392659 A1 | 12/2021 | Tirronen et al. |
| 2021/0400567 A1 | 12/2021 | Sha et al. |
| 2022/0038997 A1* | 2/2022 | Höglund ............... H04W 48/06 |
| 2022/0039098 A1 | 2/2022 | Chang et al. |
| 2022/0078737 A1 | 3/2022 | Takeda et al. |
| 2022/0104158 A1 | 3/2022 | Liu et al. |
| 2022/0124659 A1 | 4/2022 | Liberg et al. |
| 2022/0140983 A1* | 5/2022 | Medina Acosta ..... H04L 5/0044 370/329 |
| 2022/0322264 A1* | 10/2022 | Höglund ............... H04W 72/23 |

FOREIGN PATENT DOCUMENTS

| | | |
|---|---|---|
| CN | 104919883 A | 9/2015 |
| CN | 107211470 A | 9/2017 |
| CN | 107852643 A | 3/2018 |
| CN | 108337728 A | 7/2018 |
| JP | 2008193438 A | 8/2008 |
| JP | 2017005708 A | 1/2017 |
| WO | 2016048431 A1 | 3/2016 |
| WO | 2016182342 A1 | 11/2016 |
| WO | 2018033260 A1 | 2/2018 |
| WO | 2018070908 A1 | 4/2018 |

OTHER PUBLICATIONS

Huawei, et al., "Feature lead summary of Support for transmission in preconfigured UL resources", 3GPP TSG RAN WG1 Meeting #94, R1-1809571, Gothenburg, Sweden, Aug. 20-24, 2018, 1-11.
Qualcomm Incorporated, "Support for transmission in preconfigured UL resources", 3GPP TSG RAN WG1 Meeting #94, R1-1809032, Gothenburg, Sweden, Aug. 20-Aug. 24, 2018, 1-6.
Ericsson, "Support for transmission in preconfigured UL resources in LTE-MTC", 3GPP TSG-RAN WG1 Meeting #94bis, R1-1810186, Chengdu, People's Republic of China, Oct. 8-12, 2018, 1-8.
Sierra Wireless, "LTE-M Preconfigured UL Resources Summary RAN1 #95", 3GPP TSG RAN WG1 Meeting #95, R1-183725, Spokane, USA, Nov. 12-16, 2018, 1-9.
Ericsson, et al., "New WID on Rel-16 enhancements for NB-IoT", 3GPP TSG RAN Meeting #80, RP-181451; La Jolla, USA, Jun. 11-14, 2018, 1-4.
Ericsson, "New WID on Rel-16 MTC enhancements for LTE", 3GPP TSG RAN Meeting #80; RP-181450; La Jolla, USA, Jun. 11-14, 2018, 1-4.
3GPP, "3GPP TS 36.321 V15.2.0", 3rd Generation Partnership Project; Technical Specification Group Radio Access Network; Evolved Universal Terrestrial Radio Access (E-UTRA); Medium Access Control (MAC) protocol specification (Release 15), Jul. 2018, 1-126.
3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2, Jun. 2018, 1-791.
3GPP, "3rd Generation Partnership Project; Technical Specification Group Radio Access Network; Evolved Universal Terrestrial Radio Access (E-UTRAN); X2 applicaiton protocol (X2AP) (Release 15)", TS 36.423 V15.4.0, Dec. 2018, 1-408.
Ericsson, "Support for transmission in preconfigured UL resources", 3GPP TSG-RAN WG1 Meeting #94bis, R1-1810195, Chengdu, People's Republic of China. Oct. 8-12, 2018, 1-8.
Ericsson, "Support for transmission in preconfigured UL resources in LTE-MTC", 3GPP TSG-RAN WG1 Meeting #94, R1-1808035, Gothenburg, Sweden, Aug. 20-24, 2018, 1-6.
Ericsson, "Support for transmission in preconfigured UL resources in LTE-MTC", 3GPP TSG-RAN WG1 Meeting #94bis, R1-18xxxx, Chengdu, People's Republic of China. Oct. 8-12, 2018, 1-8.
Ericsson, "Transmission in preconfigured uplink resources", 3GPP TSG-RAN WG1 Meeting #103bis, R2-18xxxx, Chengdu, P.R. China, Oct. 8-12, 2018, 1-8.
Huawei, "Summary of email discussion [99#42][NB-IoT]on SPS options", 3GPP TSG-RAN WG2 Meeting#99bis, R2-1711329, Prague, Czech Republic, Oct. 8-13, 2017, 1-23.
Huawei, et al., "UL transmission in preconfigured resource", 3GPP TSG RAN WG1 Meeting #94, R1-1808118, Gothenburg, Aug. 20-24, 2018, 1-5.
Intel Corporation, "UL transmission in preconfigured resources for eMTC", 3GPP TSG RAN WG1 Meeting #94, R1-1808656, Gothenburg, Sweden, Aug. 20-24, 2018, 1-4.
LG Electronics, "Discussion on preconfigured UL resources in MTC", 3GPP TSG RAN WG1 Meeting #94, R1-1808466, Gothenburg, Sweden, Aug. 20-24, 2018, 1-5.
Nokia, et al., "Transmission in preconfigured UL resources", 3GPP TSG RAN WG1 Meeting #94, R1-1808431, Gothenburg, Sweden, Aug. 20-24, 2018, 1-4.
NTT Docomo, Inc., "UL transmission scheme in preconfigured resources", 3GPP TSG RAN WG1 Meeting #94, R1-1809129, Gothenburg, Sweden, Aug. 20-24, 2018, 1-3.
Qualcomm Incorporated, "Support for transmission in preconfigured UL resources", 3GPP TSG RAN WG1 Meeting #94, R1-1809023, Gothenburg, Sweden, Aug. 20-24, 2018, 1-7.
Sierra Wireless, "LTE-M Preconfigured UL Resources Summary", 3GPP TSG RAN WG1 Meeting 94, R1-1809528, Gothenburg, Sweden, Aug. 20-24, 2018, 1-4.
3GPP, "3GPP TS 36.213 V15.2.0", 3rd Generation Partnership Project; Technical Specification Group Radio Access Network;

(56) References Cited

OTHER PUBLICATIONS

Evolved Universal Terrestrial Radio Access (E-UTRA); Physical layer procedures (Release 15) The present, Jun. 2018, 1-541.
3GPP, "3rd Generation Partnership Project; Technical Specification Group Radio Access Network; Evolved Universal Terrestrial Radio Access Network (E-UTRAN); S1 Application Protocol (S1AP) (Release 15)", 3GPP TS 36.413 V15.4.0, Dec. 2018, pp. 1-383.
Samsung, "Discussion on transmission in preconfigured UL resources for NB-IOT", 3GPP TSG RAN WG1 Meeting #94; R1-1808738; Gothenburg, Sweden, Aug. 20-24 2018, pp. 1-5.
Huawei, et al., "Introduction of Subscription based UE differentiation", 3GPP TSG RAN Meeting #81, RP-181839, Gold Coast, Australia, Sep. 10-13, 2018, 1-22.
Nokia et al., "Preconfigured Grant for Uplink transmission", 3GPP TSG RAN WGI Meeting #94; R1-1808440; Gothenburg, Sweden, Aug. 20-24, 2018, pp. 1-4.
Sierra Wireless, "Pre-configured UL Resources Design Considerations", 3GPP TSG RAN WG1 Meeting 94, R1-1808358, Gothenburg, Sweden, Aug. 20-24, 2018, pp. 1-5.
Huawei, et al., "Introduction of Subscription based UE differentiation", 3GPP TSG RAN WG1 Meeting #81, RP-181840, Gold Coast, Australia, Sep. 10-13, 2018, 1-15.
Ericsson, "Revised WID: Additional MTC enhancements for LTE", 3GPP TSG RAN Meeting #81, RP-181878, Gold Coast, Australia, Sep. 10-13, 2018, 1-4.
Sony, "Transmission in preconfigured UL resources", 3GPP TSG RAN WG1 Meeting #94, R1-1808348, Gothenburg, Sweden, Aug. 20-24, 2018, pp. 1-4.
Intel Corporation, "UL transmission in preconfigured resources for NB-IoT", 3GPP TSG RAN WG1 Meeting #94; R1-1808661, Gothenburg, Sweden, Aug. 20-24, 2018, pp. 1-4.
Huawei, "WID revision: Additional enhancements for NB-IoT", 3GPP TSG RAN WG1 Meeting #81, RP-181674 (revision on RP-181451, Gold Coast, Australia, Sep. 10-13, 2018, 1-4.
ZTE, "Support for transmission in preconfigured UL resources for MTC", 3GPP TSG RAN WG1 Meeting #94, R1-1808632, Gothenburg, Sweden, Aug. 20-24, 2018, pp. 1-4.

* cited by examiner

SUPPORT FOR TRANSMISSION IN PRECONFIGURED UL RESOURCES

TECHNICAL FIELD

The present disclosure is generally related to the use of preconfigured resources on a radio link, and is more particularly related to techniques for configuring such preconfigured resources.

BACKGROUND

There has been a lot of work in 3GPP on specifying technologies to cover Machine-to-Machine (M2M) and/or Internet of Things (IoT) related use cases. Most recent work for 3GPP Release 13, 14 and 15 includes enhancements to support Machine-Type Communications (MTC) with new UE categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

LTE enhancements introduced in 3GPP Release 13, 14, and 15 for MTC may be referred to as "eMTC", including (not limiting) support for bandwidth limited UEs, Cat-M1, and support for coverage enhancements. This is to separate discussions from NB-IoT (notation here used for any Release), although the supported features are similar on a general level.

For both eMTC and NB-IoT, 'CIoT EPS UP optimization' and 'CIoT EPS CP optimization' signaling reductions were also introduced in Rel-13. The former, here referred to as UP-solution, allows the UE to resume a previously stored RRC connection (thus also known as RRC Suspend/Resume). The latter, here referred to as CP-solution, allows the transmission of user-plane data over NAS (aka DoNAS).

There are multiple differences between "legacy" LTE and the procedures and channels defined for eMTC and for NB-IoT. Some important differences include a new physical channel, such as the physical downlink control channels, called MPDCCH in eMTC and NPDCCH in NB-IoT, and a new physical random access channel, NPRACH, for NB-IoT. Another important difference is the coverage level (also known as coverage enhancement level) that these technologies can support. By applying repetitions to the transmitted signals and channels, both eMTC and NB-IoT allow UE operation down to much lower SNR level compared to LTE, i.e. Es/Iot≥-15 dB being the lowest operating point for eMTC and NB-IoT which can be compared to -6 dB Es/IoT for "legacy" LTE.

Uplink transmission efficiency and/or UE power consumption may be improved for LTE-M and NB-IoT, by transmitting in preconfigured resources. Transmission may involve the use of preconfigured resources in idle and/or connected mode based on SC-FDMA waveform for UEs with a valid timing advance [RAN1, RAN2, RAN4]. Both shared resources and dedicated resources can be used. Some approaches may be limited to orthogonal (multi) access schemes.

The use of preconfigured uplink resources (PUR) may have some similarities with the use of semi-persistent scheduling (SPS) but extended to Idle mode, to common resources, and/or with considerably longer SPS interval. While dedicated resources (UE-specific) may be used for PUR, there are several problems, for example, with how radio resources are assigned to UEs in RRC_IDLE mode such that the eNB does not even know what UE is in the cell anymore, how the feature is configured, how it can be ensured that radio resources are not wasted, how it can provide an adaptive solution, etc.

SUMMARY

Embodiments described herein are directed to facilitating dedicated transmissions over PUR. For example, some embodiments may include a method to configure the subsequent PUR resource utilization (e.g., on a one-at-a-time basis or on a periodic basis), changes to EDT signaling to allow functioning with PUR, etc.

According to some embodiments, a method performed by a wireless device configured for use in a wireless communication network includes transmitting, in an uplink message, a request for a configuration of preconfigured uplink resources. The method further includes receiving, during a connected mode in which the wireless device has a connection with the wireless communication network, control signaling indicating a first preconfigured resource configuration that configures a first preconfigured resource. The method also includes transmitting or receiving user data using the first preconfigured resource.

According to some embodiments, a method performed by a radio network node configured for use in a wireless communication network includes receiving from a wireless device, in an uplink message, a request for a configuration of preconfigured uplink resources. The method further includes transmitting, during a connected mode in which a wireless device has a connection with the wireless communication network, control signaling indicating a first preconfigured resource configuration that configures a first preconfigured resource. The method also includes transmitting or receiving user data using the first preconfigured resource.

In some embodiments, user data transmission or reception may be performed in idle mode (without performing random access) using a TA previously obtained in connected mode. In some embodiments, the PUR request/response signaling may be performed in idle mode (getting updated PUR resource or updated TA).

Embodiments also include corresponding apparatus, wireless devices, network nodes, radio network nodes, computer programs, and carriers (e.g., computer-readable mediums).

One advantage is that any PUR resource or configuration may be revoked and radio resources may be used for a better purpose. Another advantage of the embodiments is that PUR transmission is enabled in dedicated resources. This will limit the radio resource consumption and allow for a tailor-made solution according to the UEs traffic profile.

DETAILED DESCRIPTION

Figure 1:
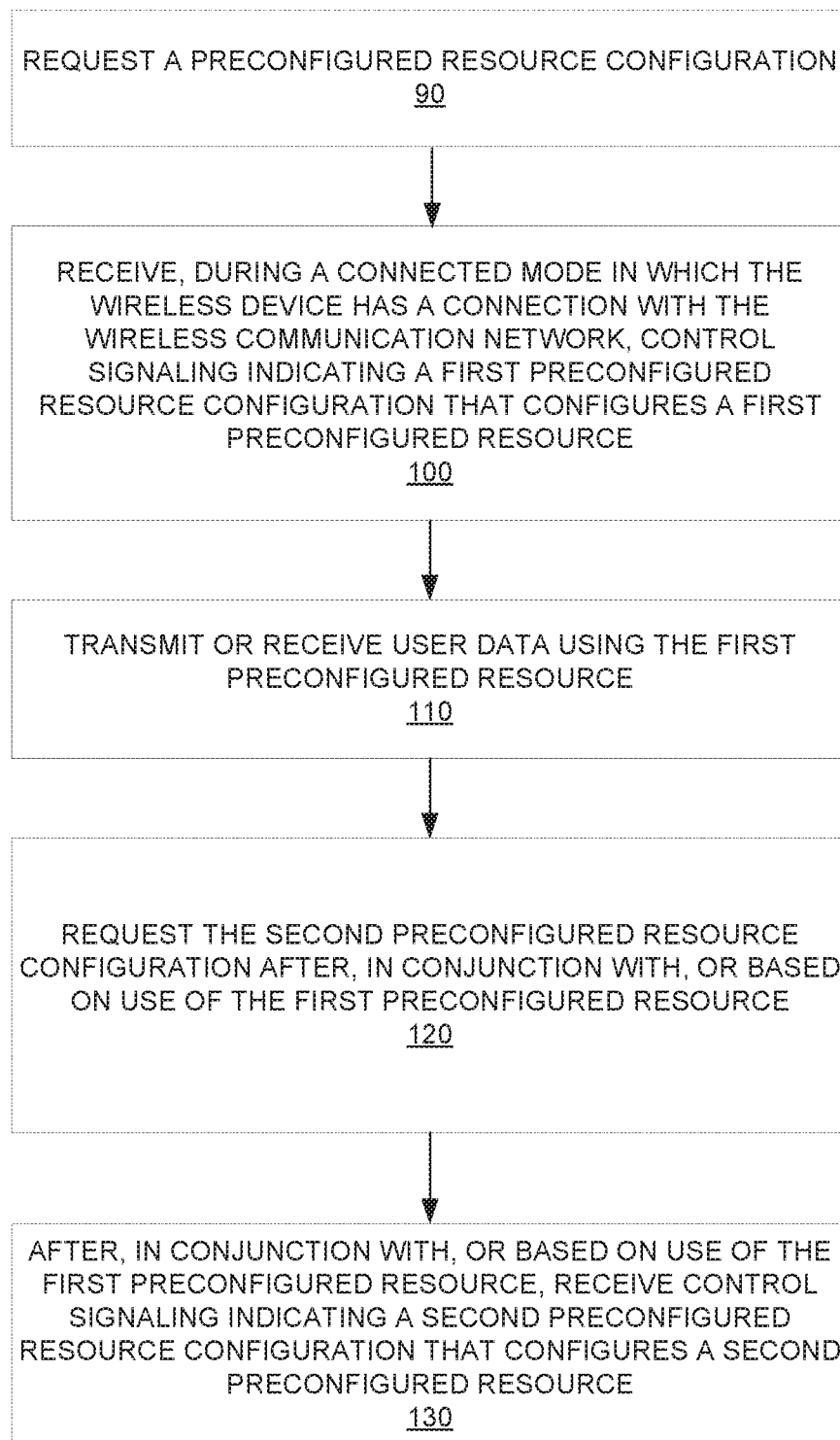
FIG. 1 is a process flow diagram illustrating an example method implemented by a wireless device.

FIG. 1 depicts a method performed by a wireless device in accordance with particular embodiments. The method includes receiving, during a connected mode in which the wireless device has a connection with the wireless communication network, control signaling indicating a first preconfigured resource configuration that configures a first preconfigured resource (block 100). The method also includes transmitting or receiving user data using the first preconfigured resource (block 110).

In some embodiments, the wireless device may transmit, in an uplink message, a request for a configuration of preconfigured uplink resources (block 90). In some embodiments, this request may be a 1-bit field. In some embodiments, the request may include one or more preferred parameters for the preconfigured uplink resources.

In some embodiments, the method may include after, in conjunction with, or based on use of the first preconfigured resource, receiving control signaling indicating a second preconfigured resource configuration that configures a second preconfigured resource (block 130). The method may further include the wireless device requesting second preconfigured resource configuration after, in conjunction with, or based on use of the first preconfigured resource (block 120).

Figure 2:
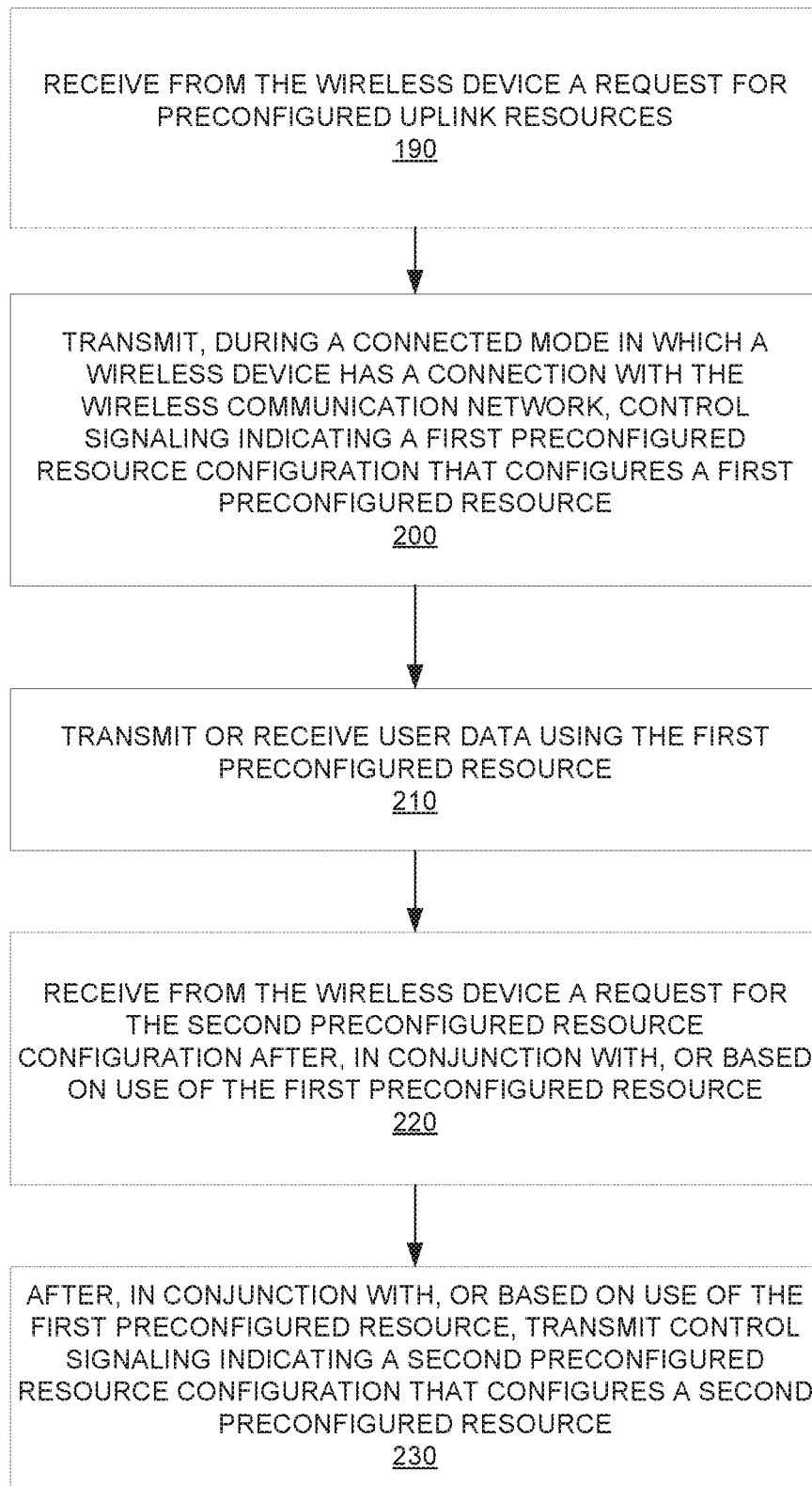
FIG. 2 is a process flow diagram illustrating an example method implemented by a network node.

FIG. 2 depicts a method performed by a radio network node in accordance with other particular embodiments. The method includes transmitting, during a connected mode in which a wireless device has a connection with the wireless communication network, control signaling indicating a first preconfigured resource configuration that configures a first preconfigured resource (block 200) and transmitting or receiving user data using the first preconfigured resource (block 210).

In some embodiments, the network node may receive, in an uplink message, a request for a configuration of preconfigured uplink resources (block 190). In some embodiments, this request may be a 1-bit field. In some embodiments, the request may include one or more preferred parameters for the preconfigured uplink resources.

In some embodiments, the method may include after, in conjunction with, or based on use of the first preconfigured resource, transmitting control signaling indicating a second preconfigured resource configuration that configures a second preconfigured resource (block 230). The method may include receiving, from the wireless device, a request for the second preconfigured resource configuration after, in conjunction with, or based on use of the first preconfigured resource (block 220).

Additional embodiments include those laid out in the EMBODIMENTS section.

As used herein, the term "preconfigured resource" (e.g., a preconfigured radio resource) refers to a resource on which a wireless device may transmit without having received a dynamic (and/or explicit) scheduling grant from a radio network node, e.g., on a downlink control channel. A preconfigured resource may be distinguished from a semi-persistent scheduling (SPS) resource in some embodiments, e.g., based on a preconfigured resource either not recurring or recurring with a longer period than an SPS resource. A preconfigured resource may be a resource on which a wireless device may transmit even in idle mode or inactive mode. In the uplink, a preconfigured resource is referred to herein as a preconfigured uplink resource, PUR.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 3:
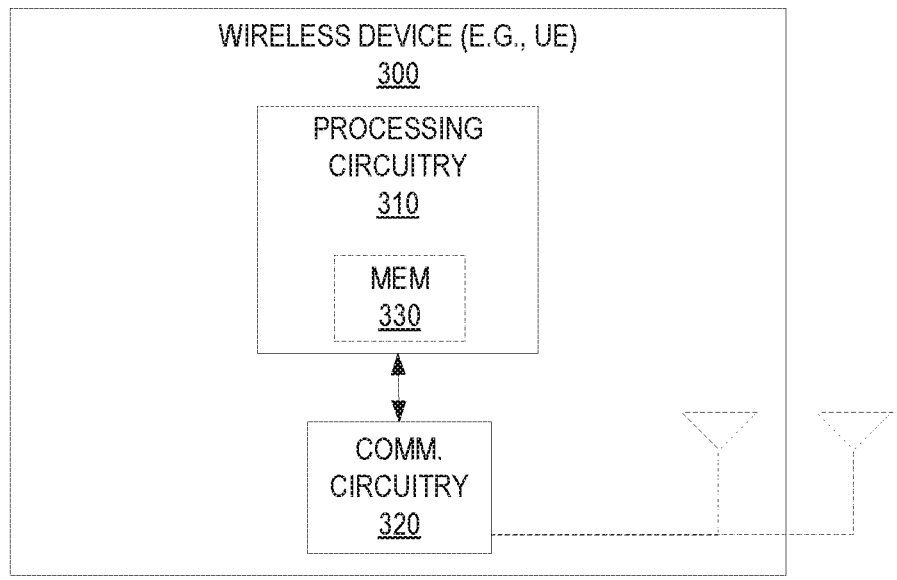
FIG. 3 and FIG. 4 illustrate an example wireless device, according to some embodiments.
Figure 4:
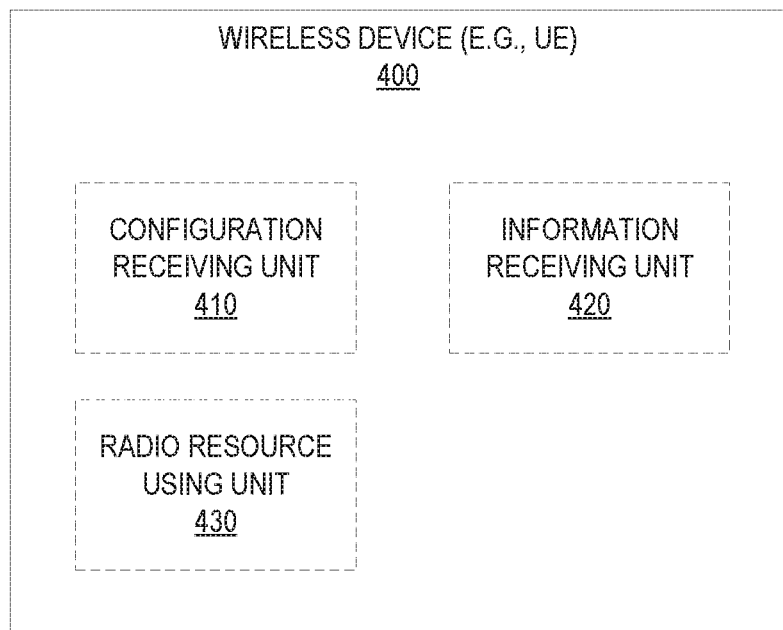

FIG. 3 for example illustrates a wireless device 300 as implemented in accordance with one or more embodiments. As shown, the wireless device 300 includes processing circuitry 310 and communication circuitry 320. The communication circuitry 320 (e.g., radio circuitry) is configured to transmit and/or receive information to and/or from one or more other nodes, e.g., via any communication technology. Such communication may occur via one or more antennas that are either internal or external to the wireless device 300. The processing circuitry 310 is configured to perform processing described above, such as by executing instructions stored in memory 330. The processing circuitry 310 in this regard may implement certain functional means, units, or modules.

FIG. 44 illustrates a schematic block diagram of a wireless device 4400 in a wireless network according to still other embodiments (for example, the wireless network shown in FIG. 77). As shown, the wireless device 400 implements various functional means, units, or modules. e.g., via the processing circuitry 310 in FIG. 3 and/or via software code. These functional means, units, or modules, e.g., for implementing the method(s) herein, include for instance: a signaling receiving unit 410 configured to receive, during a connected mode in which the wireless device has a connection with the wireless communication network, control signaling indicating a first preconfigured resource configuration that configures a first preconfigured resource and a data transmitting/receiving unit 420 configured to transmit or receive user data using the first preconfigured resource.

In some embodiments, the signaling receiving unit 410 is configured to, after, in conjunction with, or based on use of the first preconfigured resource, receive control signaling indicating a second preconfigured resource configuration that configures a second preconfigured resource. The functional implementation may also include a requesting unit 430 configured to request the second preconfigured resource configuration after, in conjunction with, or based on use of the first preconfigured resource.

Figure 5:
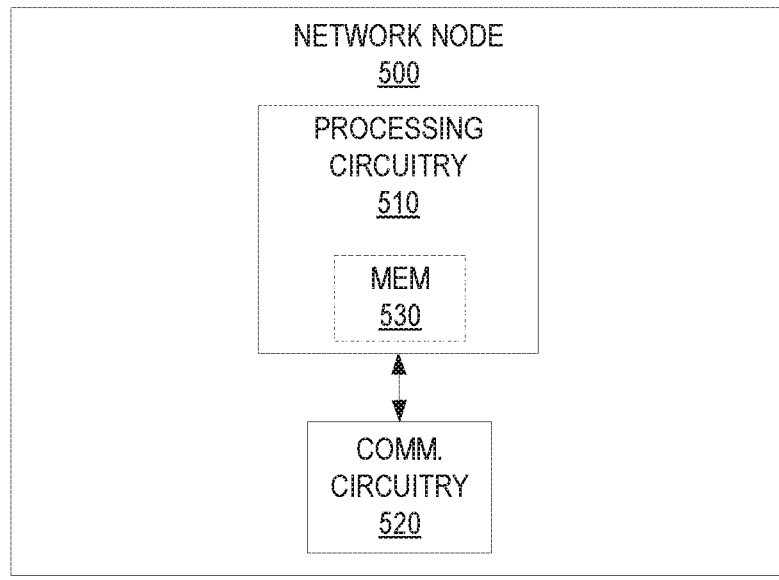
FIG. 5 and FIG. 6 illustrate an example network node, according to some embodiments.

FIG. 5 illustrates a network node 500 as implemented in accordance with one or more embodiments. The network node 500 may be, for example, a radio network node. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, such as by executing instructions stored in memory 530. The processing circuitry 510 in this regard may implement certain functional means, units, or modules.

Figure 6:
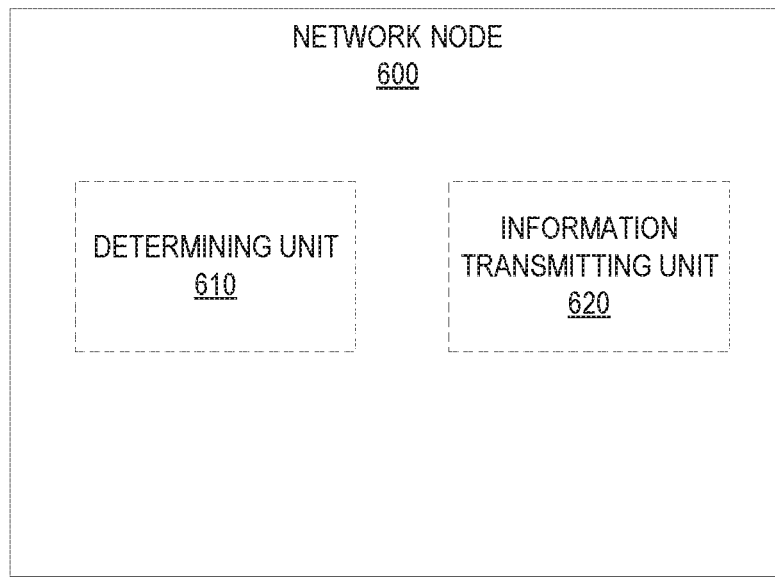
Figure 7:
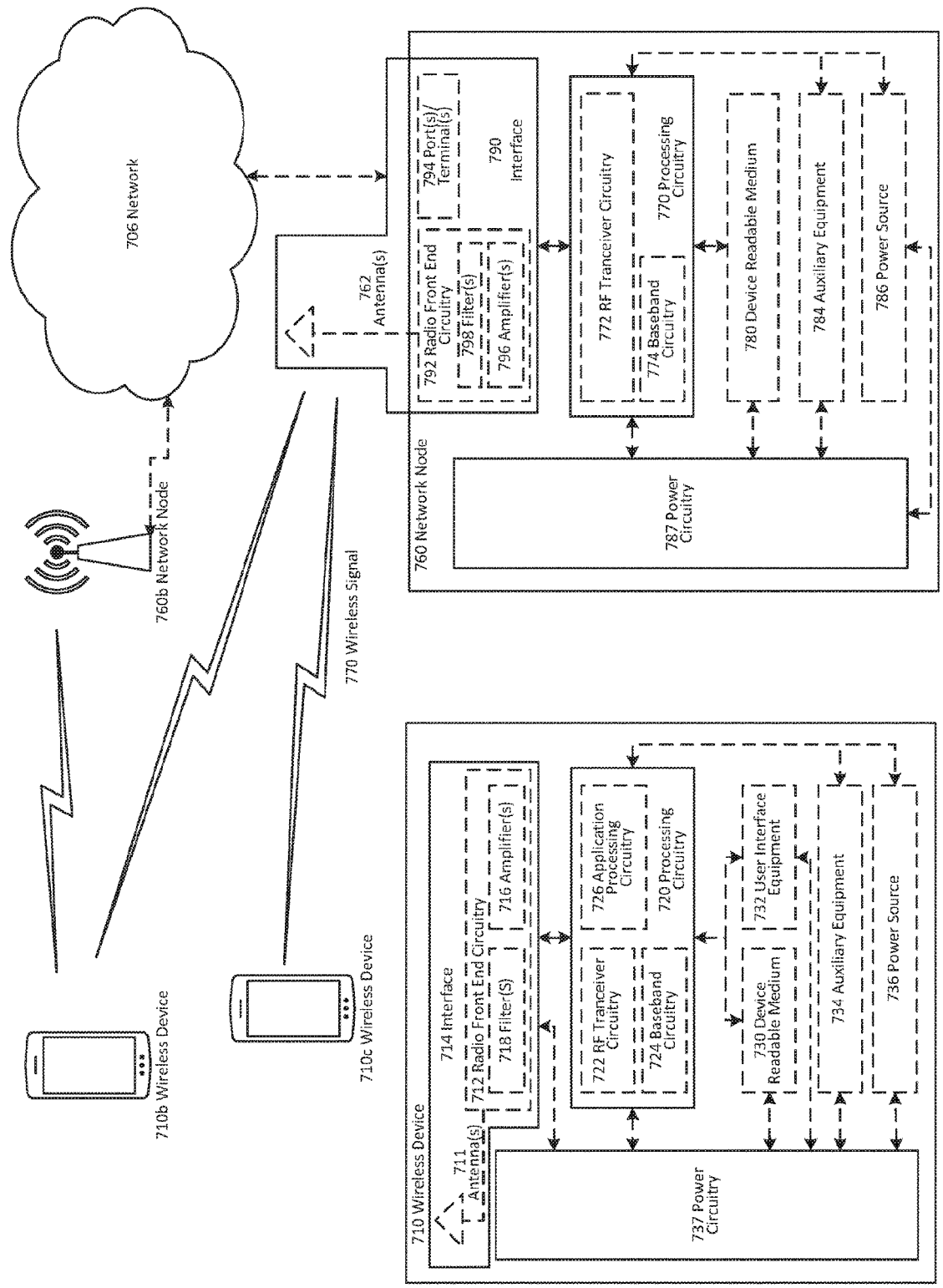
FIG. 7 is a block diagram illustrating components of an example wireless network.

FIG. 6 illustrates a schematic block diagram of a network node 600 in a wireless network according to still other embodiments (for example, the wireless network shown in FIG. 7). As shown, the network node 600 implements various functional means, units, or modules, e.g., via the processing circuitry 510 in FIG. 5 and/or via software code. These functional means, units, or modules, e.g., for implementing the method(s) herein, include for instance: a signaling transmitting unit 610 configured to transmit, during a connected mode in which the wireless device has a connection with the wireless communication network, control signaling indicating a first preconfigured resource configuration that configures a first preconfigured resource and a data transmitting/receiving unit 620 configured to transmit or receive user data using the first preconfigured resource.

In some embodiments, the signaling receiving unit 610 is configured to, after, in conjunction with, or based on use of the first preconfigured resource, transmit control signaling indicating a second preconfigured resource configuration that configures a second preconfigured resource. The functional implementation may also include a request receiving unit 630 configured to receive, from the wireless device, a request for the second preconfigured resource configuration after, in conjunction with, or based on use of the first preconfigured resource.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

MTC traffic is typically very infrequent and one objective of PUR is to preconfigure radio resources for uplink transmission that the UE can immediately use to reduce the signaling overhead for transmission, reduce UE power consumption and improve transmission efficiency (since less radio resources are used). According to the WI-objective the UE must have a valid Timing Advance (TA) to use PUR. Acquiring a TA requires an uplink transmission from the UE, and the feedback from eNB on the timing offset that the UE should apply for subsequent uplink transmissions to be receiving in sync. This is the Timing Advance Command included in the Random Access response in Msg2, and this can also be included later during the connected session by eNB to adjust the TA. Therefore, an initial transmission in the cell is required by the UE and according to some embodiments, either the legacy RRC connection setup or Rel-15 Early Data Transmission (EDT) is used for this purpose. The PUR configuration could then be provided during the initial connection or as a new addition to the EDT process.

Figure 16:
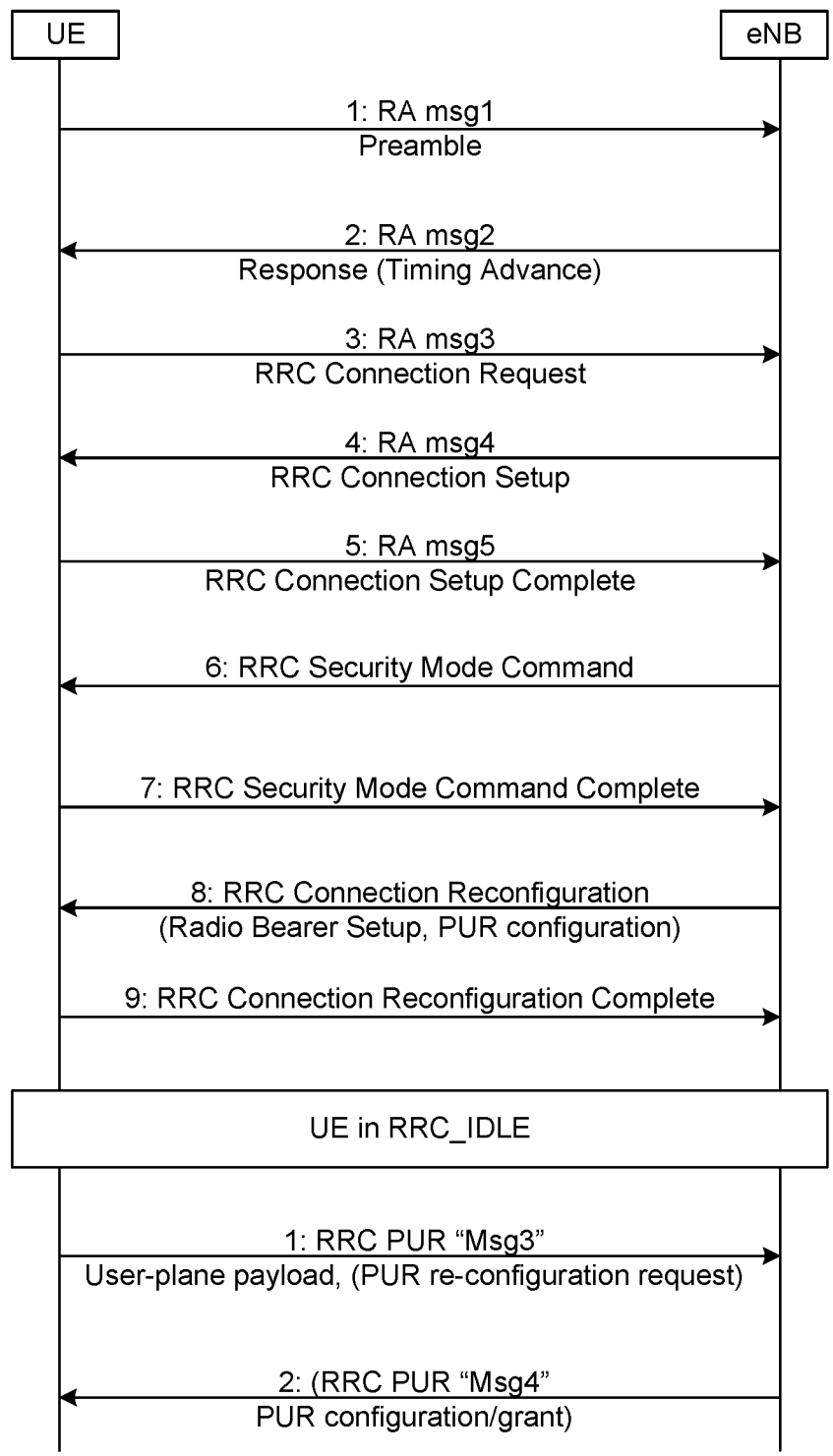
FIG. 16 is a signal flow diagram, according to some embodiments.

A signaling diagram for the configuration is shown in FIG. 16. In this example, the UE is configured with PUR via dedicated RRC signaling in the initial transmission in the cell (or group of cells if UE-context can be reused in other cells), the UE goes the RRC_IDLE (or INACTIVE) and then transmits data in the PUR resource at a later point in time. The PUR data transmission would be similar to the Rel-15 EDT data transmission in Msg3 and/or Msg4 and the EDT RRC messages could either be reused or used as baseline for the PUR RRC message versions.

Figure 17:
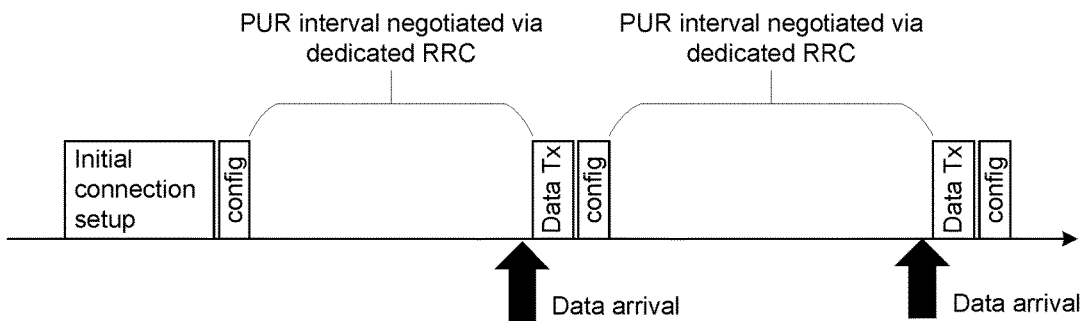
FIG. 17 illustrates an example of contention-free PUR transmission.

The PUR configuration could allocate one PUR resource at the time, and further PUR resources are configured in the subsequent PUR transmissions, as indicated in FIG. 17.

Figure 18:
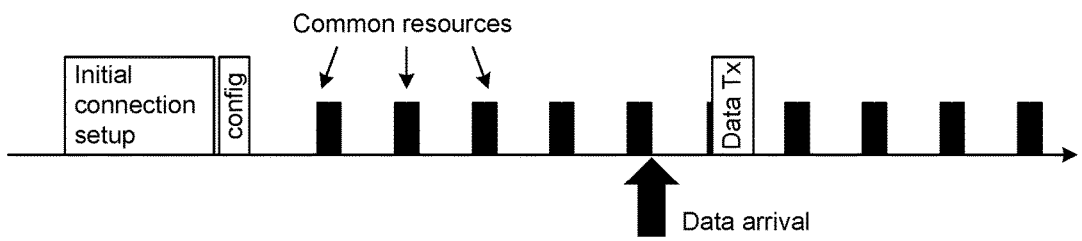
FIG. 18 illustrates an example of contention-based PUR transmission.

The PUR configuration could also allocate a periodic PUR resource, or a pool of PUR resources, for the UE to use. This is illustrated in FIG. 18.

The PUR data transmission could be contention-free. That is, the UE has a dedicated and collision-free radio resource for the transmission. The PUR data transmission can be contention-based. That is, the PUR data transmission is made in a common resource at the risk of collision with data transmission from other UEs. In the case where the PUR resource is dedicated (contention-free), the PUR configuration could be tailor-made to the UE category (e.g. Cat-M2, Cat-NB2) and capabilities (Multi-tone, 10 HARQ processes, etc.).

Further, any RAN1 enhancements that will be introduced for PUR could be configured in the PUR configuration. For example, in the cases of dedicated PUR resources, UE-specific parameters for the multiple access such as UE-specific codes. UE-specific tones/subcarrier, etc. could be indicated. Moreover, when the PUR configuration allocates a periodic PUR resource, a "PUR_resource_timer" can be used to indicate the UE for how long the uplink resources for PUR will keep reserved as to avoid a potential waste of resources (e.g., in case the UE has no more to transmit, or if the UE has abandoned the cell).

In various embodiments, the UE only transmits Msg1 and receives Msg2 of the Random Access procedure once and for all in the cell to obtain an initial TA, obtains the PUR configuration, and only Msg3 and Msg4 are transmitted for any subsequent PUR transmission in the cell. The omission of Msg1 and Msg2 will save transmissions and radio resources (i.e., signaling overhead reduction) and improve both uplink transmission efficiency and UE power consumption according to the WI-objective.

In one embodiment, the UE would, in an uplink message, transmit a 'PUR request' or 'PUR configuration request.' That is, it would be transmitted in an indication to show the eNB that it is in its interest to be configured with PUR. The 'PUR request' or 'PUR configuration request' could be a simple 1-bit indication or a control element including preferred PUR parameters such as PUR transport block size (TBS), PUR RNTI. PUR interval/time-offset, etc. The eNB would respond to this with a 'PUR response'. This, which also could be a control element, includes the eNB decision and a command which PUR-TBS. PUR-interval, RNTI, Multiple Access resource, or Modulation scheme the PUR resource allocation or "PUR UL grant" the UE should apply.

In one embodiment, the PUR is granted for one resource at the time, and PUR data transmission could be accompanied by a further 'PUR request' and 'PUR response'. Such a "chained" approached would reduce the limit the wasted resources assigned to UEs in RRC_IDLE (or INACTIVE state) to one PUR transmission occasion (if the UE leaves the cell or does not transmit for any other reason). In a further add-on to this embodiment, both the UE in 'PUR request' and the network in 'PUR response' can indicate that the message should be interpreted to contain the same information as last time. This may be done in order to reduce the signaling overhead in the case when the PUR preference or parameters are as applicable as last time.

In one embodiment, the 'PUR request' could share (N)PRACH resources similar to dedicated PHY scheduling requests, or it could multiplex the PUR request with PUR data transmission.

In one embodiment, the PUR is granted for a periodic resource and the same PUR resource would be periodically repeated in time unless there is explicit signaling on the contrary. The 'PUR request' and 'PUR response' messages would be used for re-configuring or terminating the periodic PUR resource. In a further embodiment, a "PUR_resource_timer" can be used to indicate the UE for how long time (which can be given in terms of slot, subframes, frames, etc) the uplink resources for PUR will keep reserved as to avoid a potential waste of resources.

In one embodiment, a PUR transmission in idle-mode can include mainly two steps. In a first step, the legacy connection establishment is re-used (e.g., legacy RRC connection setup or Rel-15 Early Data Transmission (EDT)) to acquire the initial TA, and to get in connected-mode a pre-configuration of UL resources (PUR UL grant) that might be used by the UE in future idle mode transmissions. In a second step, after evaluating and fulfilling some criteria (including TA validity), the UE might perform an IDLE mode transmission on pre-configured UL resources directly on Msg3 (i.e., skipping Msg1 and Msg2) by using either a periodic or an on-demand approach.

In one embodiment, the PUR configuration or grant includes any of the following parameters: the time offset/interval, Timing Advance info, the repetition number or Coverage Enhancements level, PUR RNTI, the transport block size, modulation and coding scheme, resource indication for HARQ retransmissions, and/or any other parameters contained in the 'UL grant' according to 36.213. Optionally, it could be indicated if the resource is contention-based or contention-free.

In one embodiment, the 'PUR response' includes a Timing Advance Command in order to update the Timing Advance applied by the UE.

In one embodiment, the PUR configuration parameters as of above, are added and stored as part of the UE-context (stored in eNB for CIoT UP-optimization and stored in MME for CIoT CP-optimization).

In one embodiment, the PUR resources are granted for certain time. That is, the UE is configured with a timer as part of the PUR configuration and the UE is only allowed to use the PUR resources as long as this timer has not expired.

In one embodiment, the PUR configuration includes parameters that the UE should apply for the PUR transmission. For example, parameters for Multiple Access in the PUR resources, such as a UE-specific code for CDMA, spatial parameters, sub-PRB parameters, a subcarrier allocation (e.g., single-tone and/or multi-tone allocation) that the UE should apply, etc.

In one embodiment, the PUR configuration is an uplink grant (or downlink assignment) with a longer time offset applied.

In one embodiment, the PUR configuration is generic and it would not be clear to the UE if it is a dedicated (contention-free) or common (contention-based) PUR resource. The decision to overload UEs in the same radio resources could then be left to eNB implementation.

In one embodiment, the Rel-15 Early Data Transmission RRC messages for Msg3 and Msg4 are reused, or used as baseline, for the PUR data transmission. Either EDT Short-MAC-I, a new PUR RNTI, I-RNTI, or similar can be used as ResumeID.

In one embodiment, the UE must evaluate to check if its Timing Advance is still valid before transmission in PUR resources. The set of conditions could be based on testing any TA validity mechanism, e.g., detected change in UE position, change is RSRP/RSRQ, etc.

In one embodiment, the PUR configuration for a UE is based on the 'Subscription Based LIE Differentiation Information' (see TS 36.423 and 36.413). For example, the configuration may be based on the parameters: Periodic Time, Battery Indication, Traffic Profile, Stationary Indication, Scheduled Communication Time, etc.

In one embodiment, the PUR resources are available to the UE independent of whether it resides in RRC_IDLE or RRC_CONNECTED. In this way, the per-request/one-PUR-at-the-time solution would be an extension to legacy SPS operation in RRC_CONNECTED.

In one embodiment, it is up to the network whether to instruct the UE to move to RRC_CONNECTED mode or not after the PUR transmission.

In one embodiment, the UE does not trigger Scheduling Request, Random Access or any other uplink transmission if it has a valid PUR configuration that can be used for the data transmission.

In one embodiment, the UE is configured with a dedicated PUR RNTI which is used for HARQ retransmissions. That is, the eNB can make use of the dedicated PUR RNTI when scheduling retransmissions to allow HARQ soft-combining.

In one embodiment, the UE is configured with a common PUR RNTI and the HARQ retransmissions for PUR transmissions work in the same way as legacy Msg3 transmissions using the Temporary C-RNTI.

In one embodiment, the PUR RNTI is derived from the PUR resource used and from this it would be clear to the UE if it is requested to retransmit. It could be based on, for example, the subframe number, radio frame number, single-tone, subcarrier, carrier, CDMA code. NOMA resource. ResumeID, etc.

In one embodiment, to enable to eNB to schedule retransmissions, the UE is required to monitor (M/N)PDCCH during a (configured) time period with a (configured) DRX cycle after the PUR transmission (possibly with an offset for the start positioning making it a time window).

Figure 19:
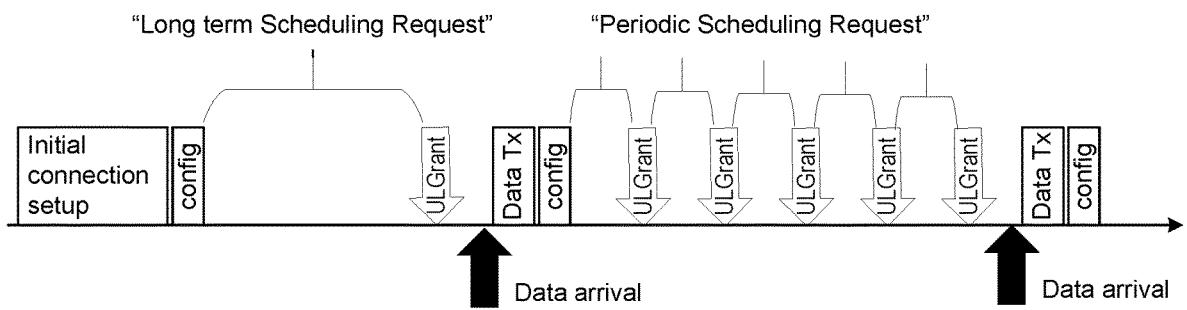
FIG. 19 illustrates DCI-based PUR operation.

In one embodiment, the UE still monitors (M/N)PDCCH and is dependent of DCI assignment for PUR transmission. This is illustrated in FIG. 19, which is a schematic illustration of DCI-based PUR operation. As compared to other solutions, the PUR configuration is configuring when the UE should monitor (M/N)PDCCH to check for DCI for PUR transmissions. That is, the UE could be configured to monitor (M/N)PDCCH with a certain RNTI (PUR-RNTI etc.) with a certain DRX cycle during a time window, e.g., monitor with DRX of 2.56 s during a 20 s time window in 12 h after the configuration. In an example for periodic PUR, the UE would simply be configured to monitor (M/N) PDCCH with a certain RNTI and a certain DRX cycle (which could be different from the DRX cycle used for monitoring regular paging). The drawback of this embodiment would be additional signaling overhead and UE power consumption from transmitting and monitoring (M/N) PDCCH. The benefit of this solution is increased network control and it would be straight forward to revoke any resources earlier configured. That is, there would be no additional solution needed for access control, and the UE would reside to legacy (pre Rel-16) transmission of data if the UE has not received a PUR grant/assignment before a configured number of (N/M)PDCCH occasions or the expiration of a certain timer. This solution would be similar to a long-term or periodic Scheduling Request.

In an alternative embodiment, the semi-static part of the PUR configuration can be indicated in UE-specific RRC signaling and/or in cell-specific system information (signaling). The dynamic part of the PUR configuration can be indicated in the form of an UL grant carried by (M/N) PDCCH or carried by a message similar to a Random Access Response (RAR) message. For example, the semi-static part can indicate the time occasion where the UL grant can be transmitted, and the UL grant can indicate the frequency-domain resource allocation and modulation and coding scheme (MCS). In this case, the eNB performs the access control by sending an appropriate UL grant or by choosing not to send any UL grant. This embodiment provides eNB with a very flexible way to enable or disable UL resources for use as PUR resources.

Although the above description is for preconfigured uplink resources, various embodiments are generalized to also cover the case of preconfigured downlink resources.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760*b*, and WDs 710, 710*b*, and 710*c*. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS). Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks. IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes. SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, the term "wireless device" (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM. WCDMA, LTE, NR, WiFi, WiMAX, NB-IoT, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments. RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
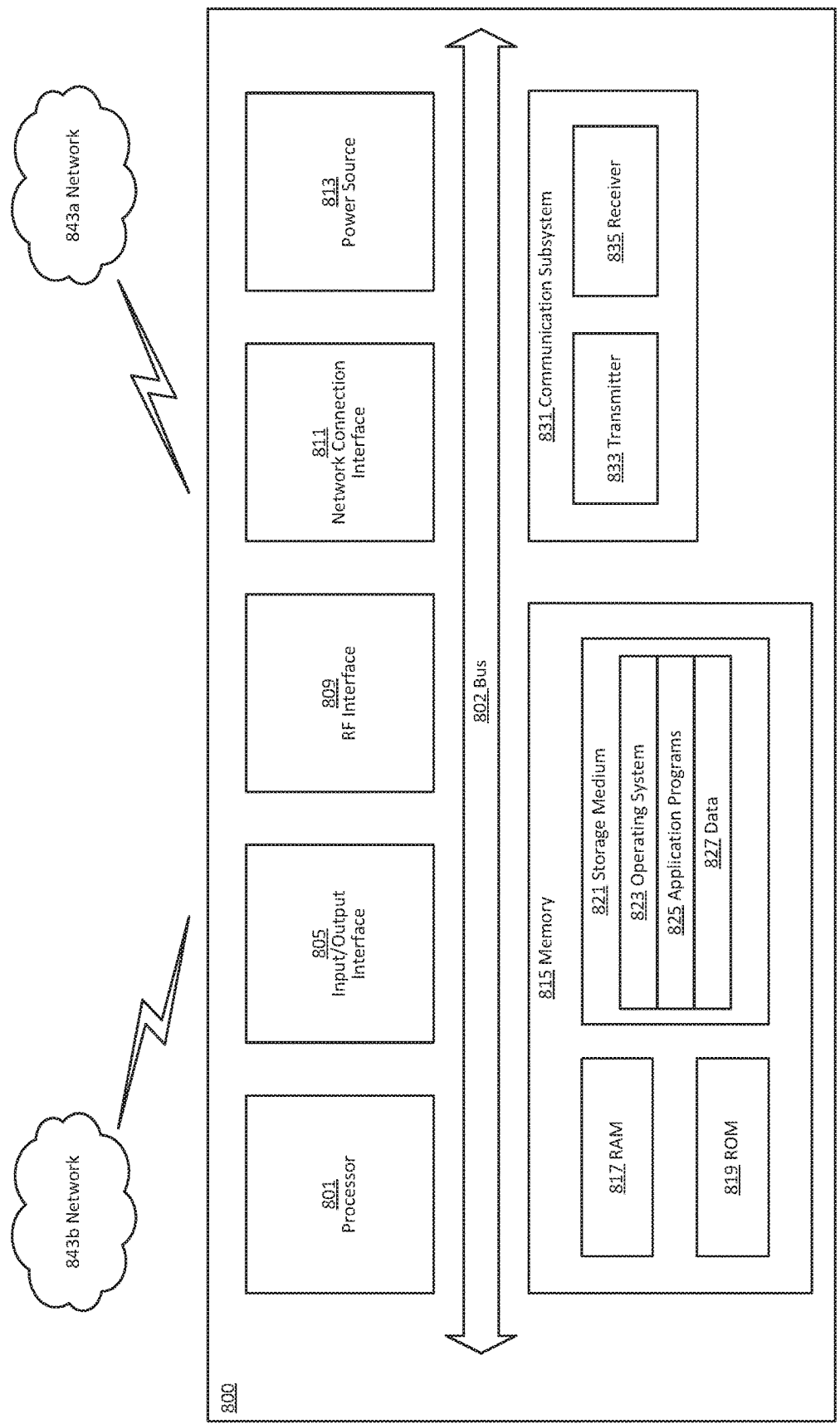
FIG. 8 illustrates one embodiment of a UE in accordance with various aspects described herein.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the 3rd Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843*a*. Network 843*a* may encompass wired and/or wireless networks such as a local-area network (LAN), a wide-area network (WAN), a computer network, a wireless network, a telecommunications network, another like network or any combination thereof. For example, network 843*a* may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.811, CDMA, WCDMA. GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication. Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
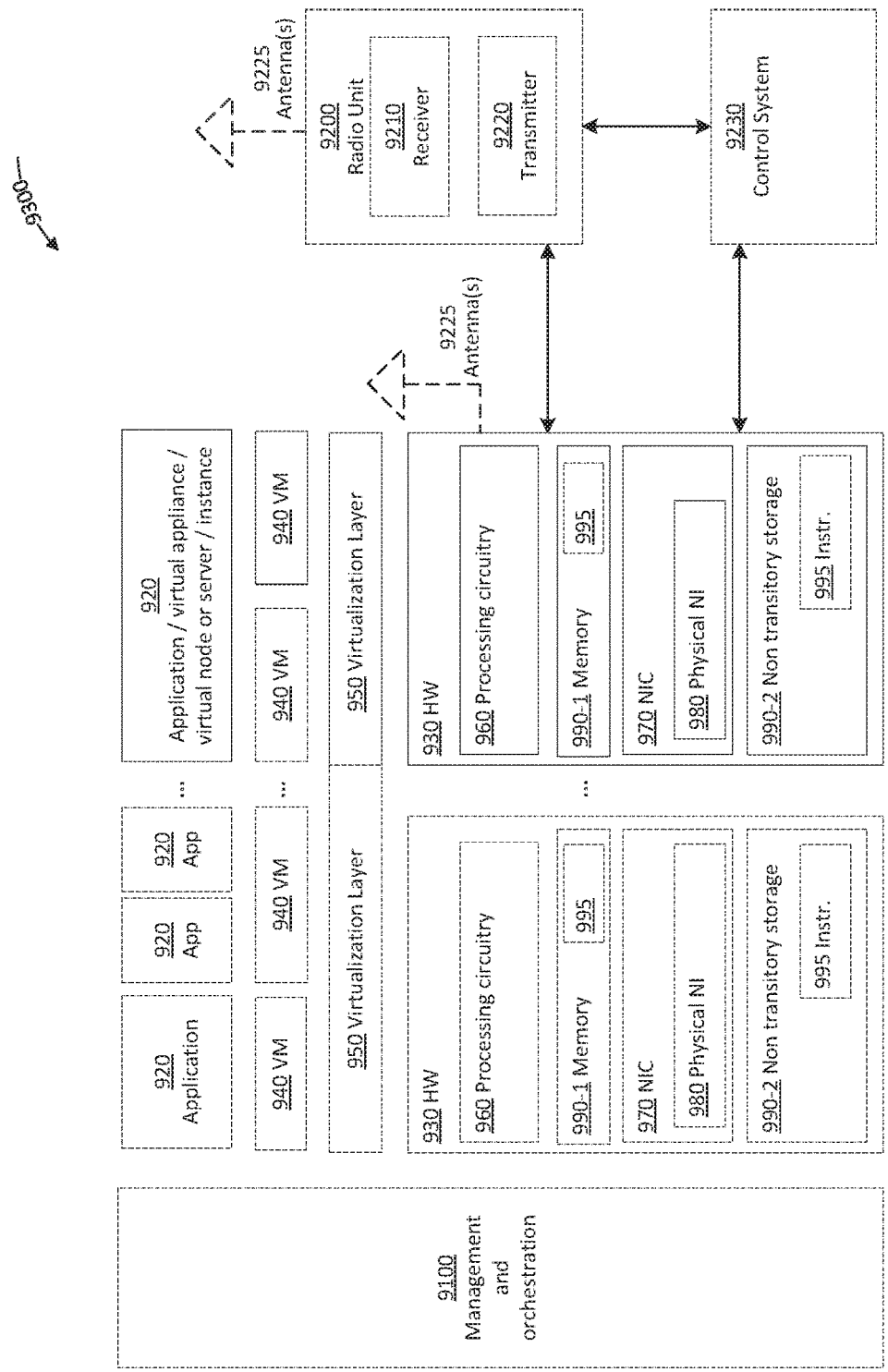
FIG. 9 is a schematic block diagram illustrating a virtualization environment in which functions implemented by some embodiments may be virtualized.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be affected with the use of control system 9230 which may alternatively be used for communication between the hardware nodes 930 and radio units 9200.

Figure 10:
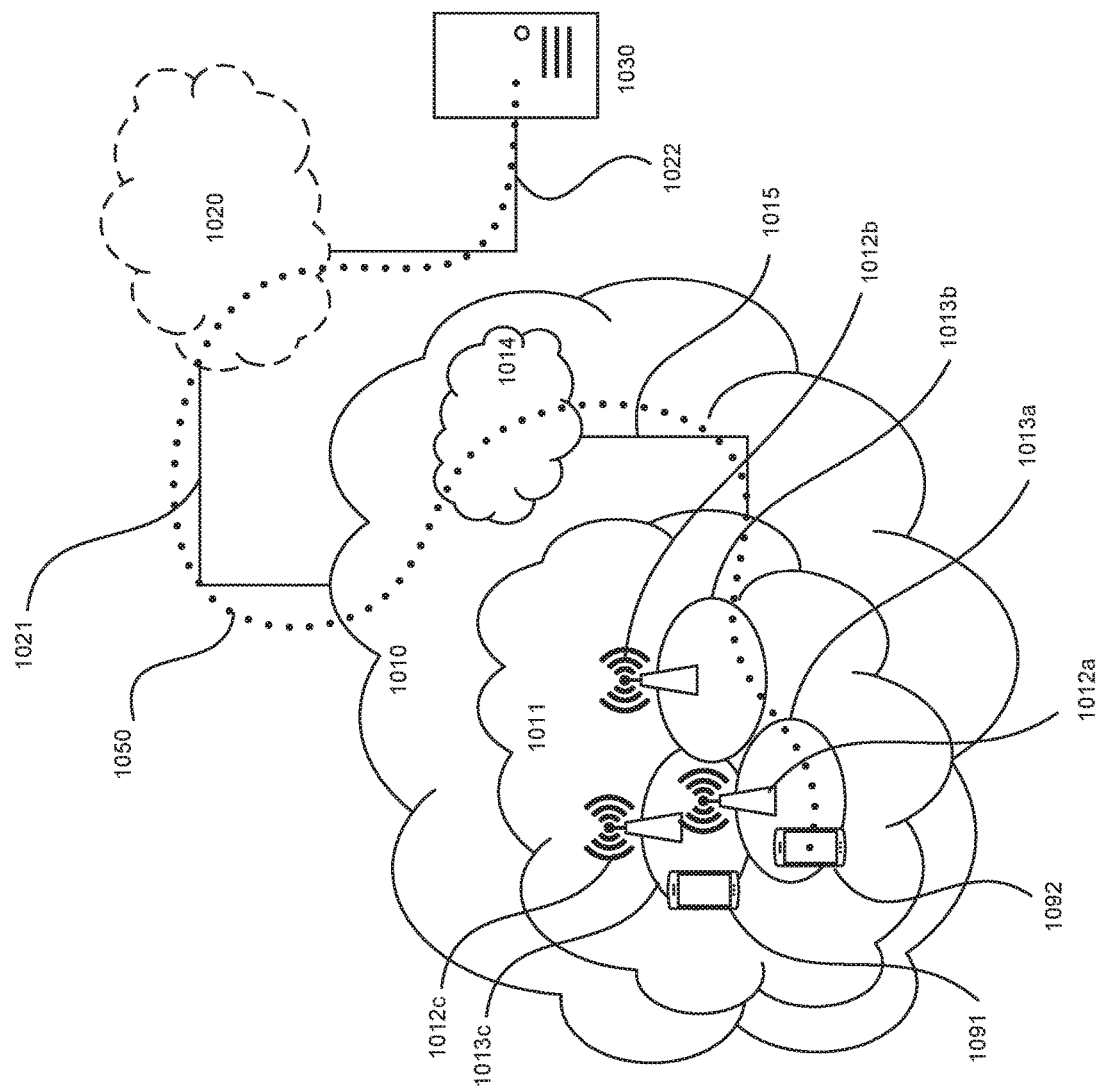
FIG. 10 illustrates a telecommunication network connected via an intermediate network to a host computer in accordance with some embodiments.

FIG. 10 illustrates a telecommunication network connected via an intermediate network to a host computer in accordance with some embodiments. In particular, with reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Figure 11:
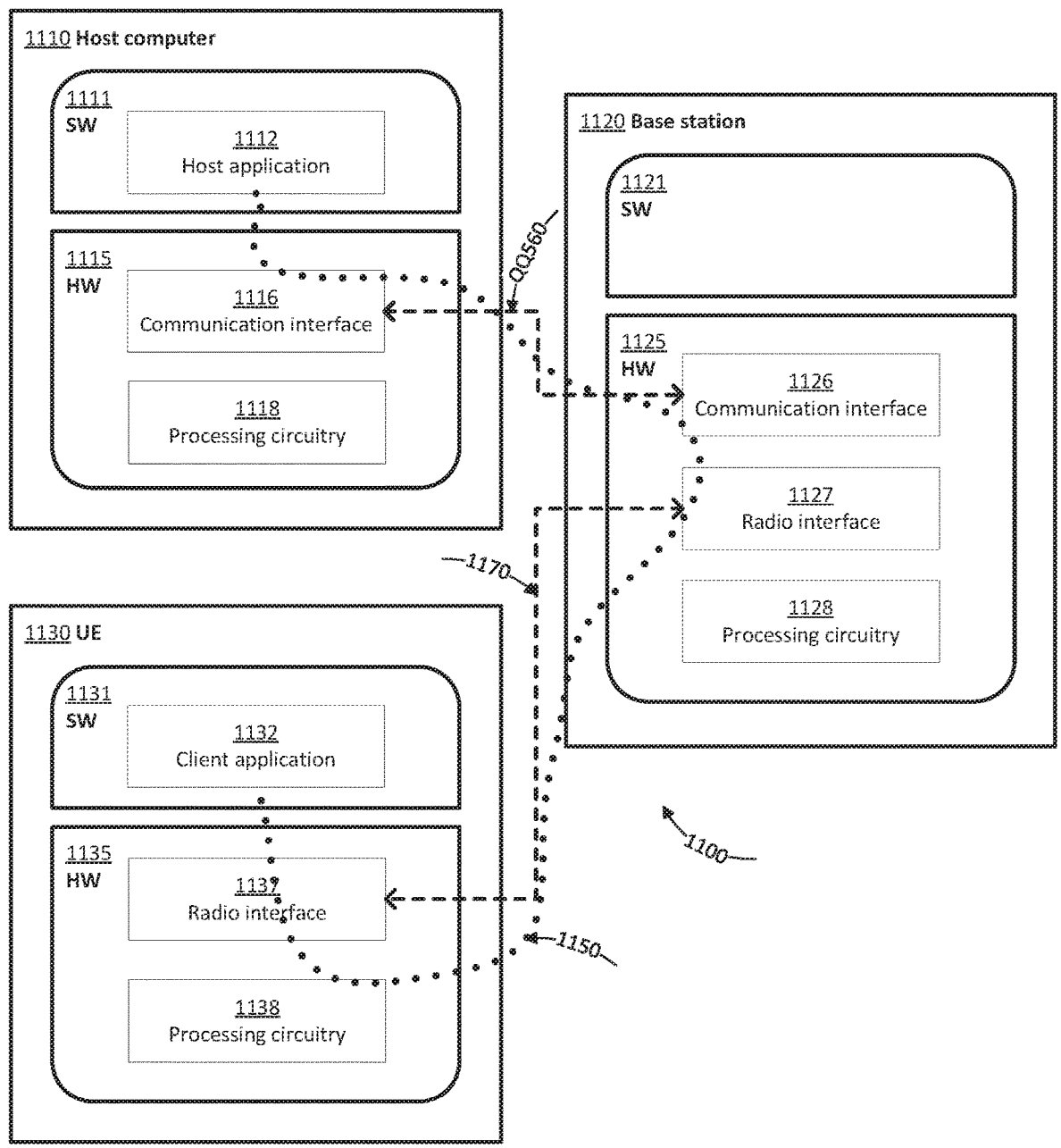
FIG. 11 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 11. FIG. 11 illustrates host computer communicating via a base station with a user equipment over a partially wireless connection in accordance with some embodiments In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments enable any PUR resource or configuration to be revoked and radio resources used for a better purpose. Another advantage of the embodiments is that PUR transmission is enabled in dedicated resources. This will limit the radio resource consumption and allow for a tailor-made solution according to the UEs traffic profile. The embodiments thereby provide benefits such as better capacity, better responsiveness and better battery life.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
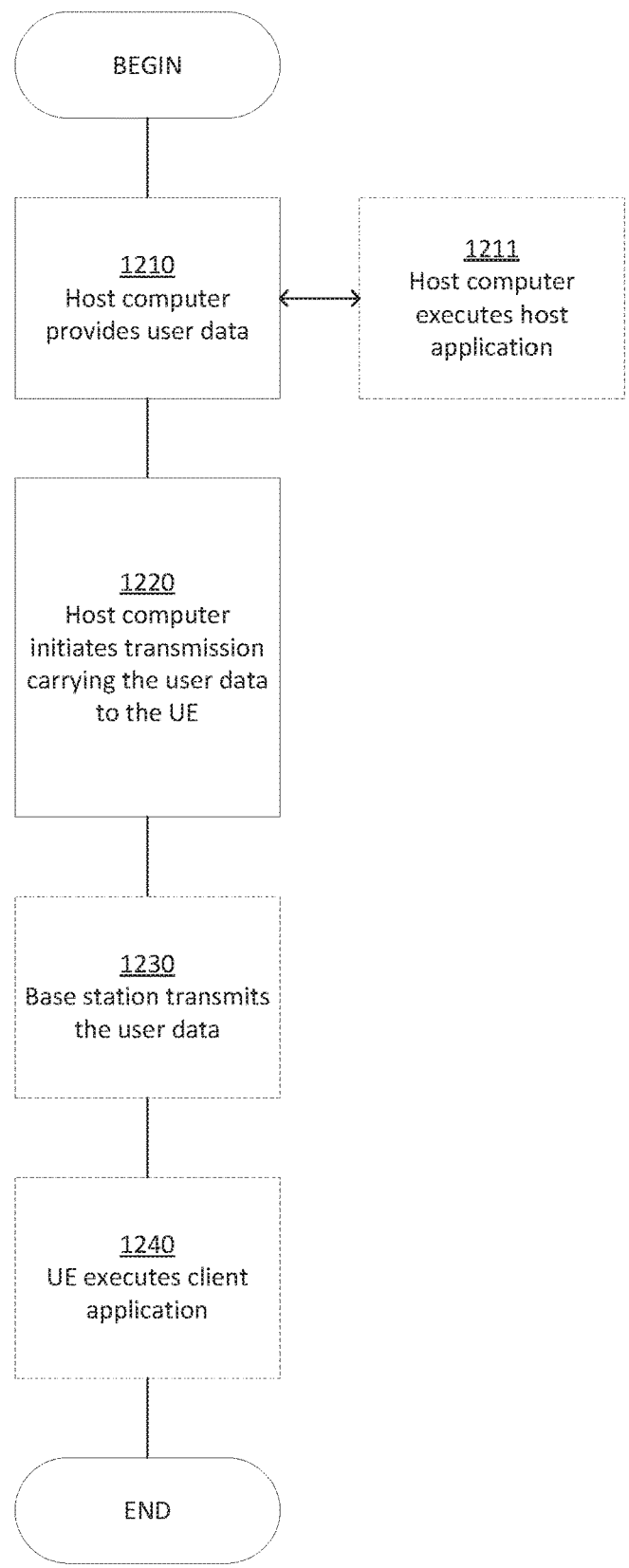
FIG. 12 is a flowchart illustrating a method implemented in a communication system.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
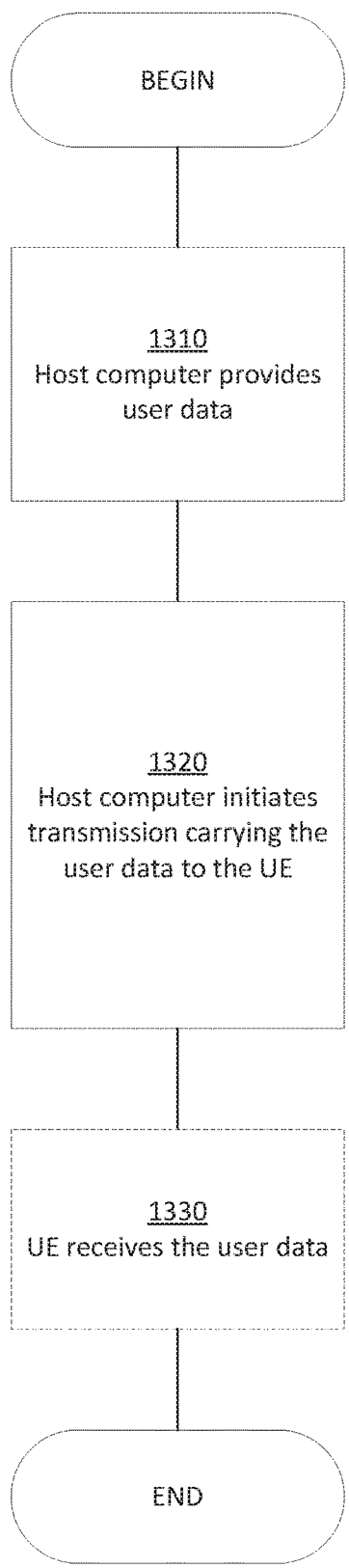
FIG. 13 is a flowchart illustrating a method implemented in a communication system.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
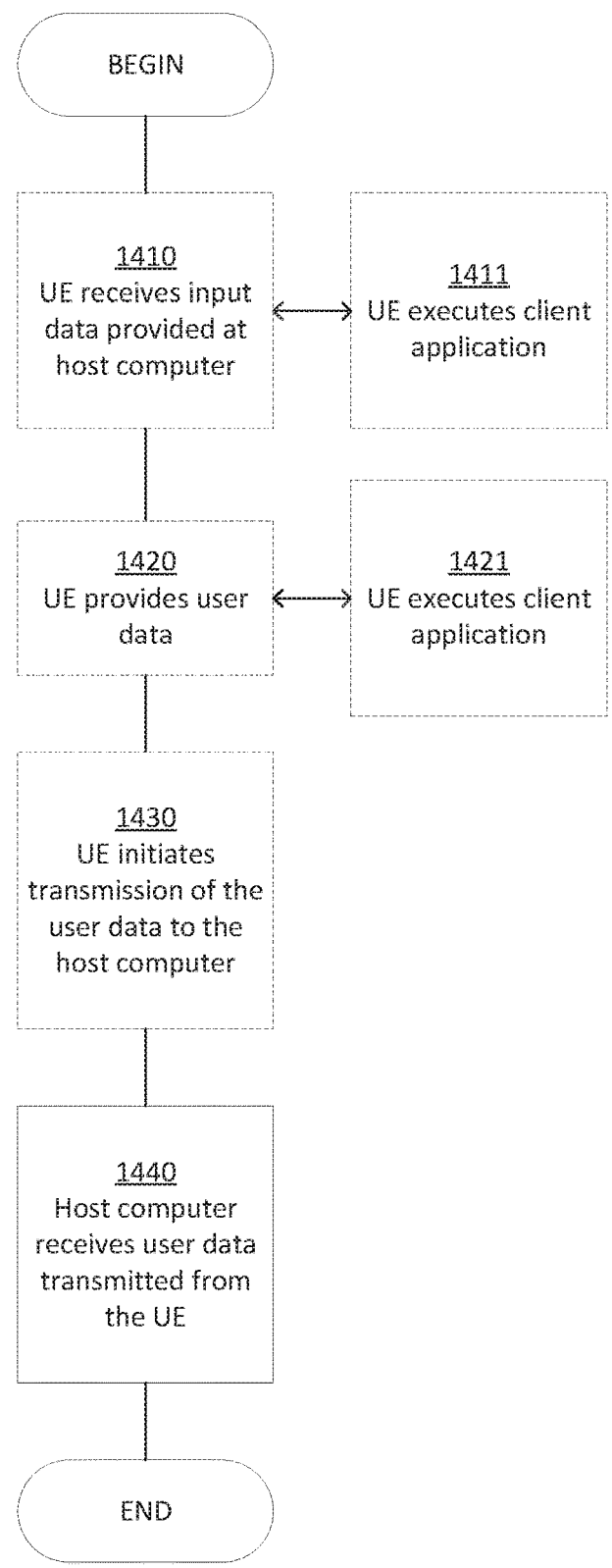
FIG. 14 is a flowchart illustrating another method implemented in a communication system.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
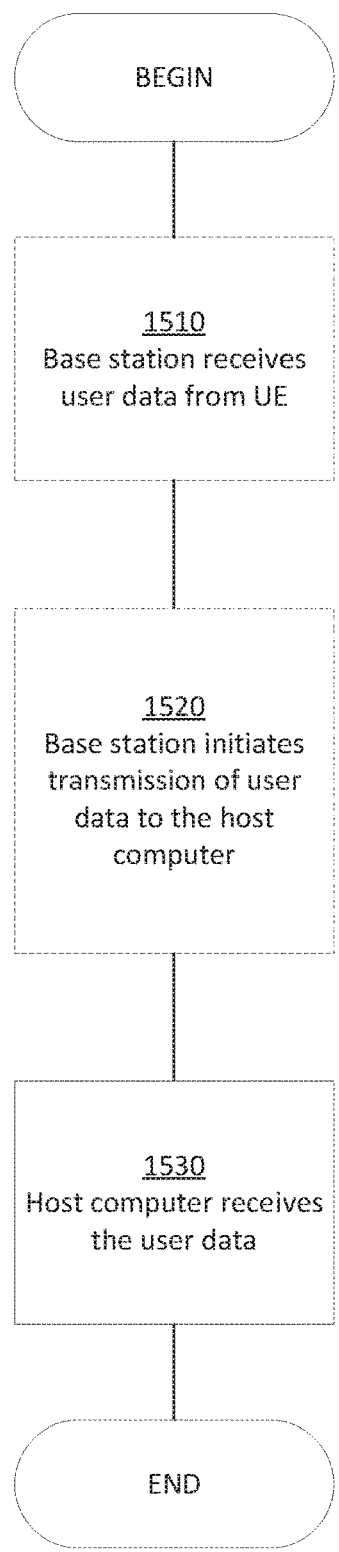
FIG. 15 is a flowchart illustrating still another method implemented in a communication system.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the claims set forth below; rather, these claims are provided by way of example to convey the scope of the subject matter to those skilled in the art.

EXAMPLE EMBODIMENTS

Group A Embodiments

1. A method performed by a wireless device configured for use in a wireless communication network, the method comprising:
   receiving, during a connected mode in which the wireless device has a connection with the wireless communication network, control signaling indicating a first preconfigured resource configuration that configures a first preconfigured resource; and
   transmitting or receiving user data using the first preconfigured resource.
2. The method of embodiment 1, further comprising after, in conjunction with, or based on use of the first preconfigured resource, receiving control signaling indicating a second preconfigured resource configuration that configures a second preconfigured resource.
3. The method of embodiment 2, further comprising requesting the second preconfigured resource configuration after, in conjunction with, or based on use of the first preconfigured resource.
4. The method of embodiment 3, wherein said requesting comprises transmitting a request for the second preconfigured resource configuration, wherein said transmitting or receiving user data comprises transmitting user data using the first preconfigured resource, and wherein the request is included in the same message as or otherwise accompanies the user data.
5. The method of any of embodiments 3-4, wherein said requesting comprises transmitting a request for the second preconfigured resource configuration, wherein the request requests that the second preconfigured resource configuration be the same as the first preconfigured resource configuration or that one or more configuration parameters of the second preconfigured resource configuration be the same as the one or more configuration parameters of the first preconfigured resource configuration.
6. The method of any of embodiments 3-5, wherein said requesting comprises transmitting a request for the second preconfigured resource configuration, wherein the request is a 1-bit field.
7. The method of any of embodiments 2-6, wherein the control signaling indicating the second preconfigured resource configuration indicates that one or more configuration parameters of the second preconfigured resource configuration is the same as the one or more configuration parameters of the first preconfigured resource configuration.
8. The method of any of embodiments 2-7, wherein the second preconfigured resource is the same as the first preconfigured resource except that the second preconfigured resource occurs later in time.
9. The method of any of embodiments 2-8, wherein the control signaling indicating the second preconfigured resource configuration is a 1-bit field.
10. The method of any of embodiments 1-9, wherein said transmitting or receiving user data comprises transmitting user data.
11. The method of embodiment 10, further comprising receiving a timing advance as part of transitioning to, or during, the connected mode, and wherein transmitting the user data is performed using said timing advance.
12. The method of any of embodiments 2-11, wherein the control signaling indicating the second preconfigured resource configuration also indicates a timing advance.
13. The method of embodiment 12, further comprising transmitting user data using the second preconfigured resource and using the timing advance indicated by the control signaling.
14. The method of embodiment 13, wherein transmitting user data using the second preconfigured resource is performed during an idle mode in which the wireless device does not have a connection with the wireless communication network or during an inactive mode in which the wireless device has an inactive connection with the wireless communication network.
15. The method of any of embodiments 2-14, wherein the control signaling indicating the second preconfigured resource configuration is received during an idle mode in which the wireless device does not have a connection with the wireless communication network or during an inactive mode in which the wireless device has an inactive connection with the wireless communication network.

16. The method of any of embodiments 1-15, wherein said transmitting or receiving user data is performed during an idle mode in which the wireless device does not have a connection with the wireless communication network or during an inactive mode in which the wireless device has an inactive connection with the wireless communication network.

17. The method of embodiment 16, wherein said transmitting or receiving user data is performed without having performed a random access procedure since existing the connected mode and entering the idle mode or the inactive mode.

18. The method of embodiment 16, wherein said transmitting or receiving user data is performed without having transmitted message 1 of a random access procedure, and/or receiving message 2 of a random access procedure, since existing the connected mode and entering the idle mode or the inactive mode.

19. The method of any of embodiments 1-18, further comprising transmitting or receiving user data using non-recurring preconfigured resources during an idle mode or an inactive mode, without having performed a random access procedure since existing the connected mode and entering the idle mode or the inactive mode, wherein the idle mode is a mode in which the wireless device does not have a connection with the wireless communication network or the inactive mode is a mode in which the wireless device has an inactive connection with the wireless communication network.

20. The method of any of embodiments 1-19, further comprising transmitting user data using non-recurring preconfigured resources during an idle mode or an inactive mode, using a timing advance received the last time the wireless device was in a connected mode or received during the idle mode or the active mode.

21. The method of any of embodiments 1-20, wherein said transmitting or receiving user data comprises transmitting user data using the first preconfigured resource using a Message 3 format of a random access procedure or a radio resource control (RRC) connection request message.

22. The method of any of embodiments 1-20, wherein said transmitting or receiving user data comprises transmitting user data using the first preconfigured resource using an early data transmission (EDT) Message 3 format of a random access procedure, an EDT RRC message, or a message format that is for or based on EDT.

23. The method of any of embodiments 1-20, wherein said transmitting or receiving user data comprises receiving user data using the first preconfigured resource using a Message 4 format of a random access procedure or a radio resource control (RRC) connection setup message.

24. The method of any of embodiments 1-20, wherein said transmitting or receiving user data comprises receiving user data using the first preconfigured resource using an early data transmission (EDT) Message 4 format of a random access procedure, an EDT RRC message, or a message format that is for or based on EDT.

25. The method of any of embodiments 1-24, wherein the control signaling indicating the first preconfigured resource configuration is dedicated control signaling.

26. The method of any of embodiments 1-25, wherein said transmitting or receiving user data using the first preconfigured resource is performed responsive to determining that validity or reservation of the first preconfigured resource has not expired.

27. The method of any of embodiments 1-26, comprising transmitting or receiving the user data using the first preconfigured resource instead of triggering a scheduling request or random access.

28. The method of any of embodiments 1-27, wherein the first preconfigured resource configuration is generic or agnostic as to whether the first preconfigured resource is a common resource or a dedicated resource.

AA. The method of any of the previous embodiments, wherein the first preconfigured resource is a non-recurring preconfigured resource.

AB. The method of any of the previous embodiments, wherein the second preconfigured resource is a non-recurring preconfigured resource.

AC. The method of any of the previous embodiments, further comprising:

providing user data; and forwarding the user data to a host computer via the transmission to the base station.

Group B Embodiments

29. A method performed by a radio network node configured for use in a wireless communication network, the method comprising:

transmitting, during a connected mode in which a wireless device has a connection with the wireless communication network, control signaling indicating a first preconfigured resource configuration that configures a first preconfigured resource; and transmitting or receiving user data using the first preconfigured resource.

30. The method of embodiment 29, further comprising after, in conjunction with, or based on use of the first preconfigured resource, transmitting control signaling indicating a second preconfigured resource configuration that configures a second preconfigured resource.

31. The method of embodiment 30, further comprising receiving from the wireless device a request for the second preconfigured resource configuration after, in conjunction with, or based on use of the first preconfigured resource.

32. The method of embodiment 31, wherein said transmitting or receiving user data comprises receiving user data using the first preconfigured resource, and wherein the request is included in the same message as or otherwise accompanies the user data.

33. The method of any of embodiments 31-32, wherein the request requests that the second preconfigured resource configuration be the same as the first preconfigured resource configuration or that one or more configuration parameters of the second preconfigured resource configuration be the same as the one or more configuration parameters of the first preconfigured resource configuration.

34. The method of any of embodiments 31-33, wherein the request is a 1-bit field.

35. The method of any of embodiments 30-34, wherein the control signaling indicating the second preconfigured resource configuration indicates that one or more configuration parameters of the second preconfigured resource configuration is the same as the one or more configuration parameters of the first preconfigured resource configuration.

36. The method of any of embodiments 30-35, wherein the second preconfigured resource is the same as the first preconfigured resource except that the second preconfigured resource occurs later in time.
37. The method of any of embodiments 30-36, wherein the control signaling indicating the second preconfigured resource configuration is a 1-bit field.
38. The method of any of embodiments 29-37, wherein said transmitting or receiving user data comprises receiving user data.
39. The method of embodiment 38, further comprising transmitting a timing advance as part of the wireless device transitioning to, or during, the connected mode, and wherein receiving the user data is performed without having transmitting another timing advance to the wireless device.
40. The method of any of embodiments 30-39, wherein the control signaling indicating the second preconfigured resource configuration also indicates a timing advance.
41. The method of embodiment 40, further comprising receiving user data using the second preconfigured resource.
42. The method of embodiment 41, wherein receiving user data using the second preconfigured resource is performed during an idle mode in which the wireless device does not have a connection with the wireless communication network or during an inactive mode in which the wireless device has an inactive connection with the wireless communication network.
43. The method of any of embodiments 30-42, wherein the control signaling indicating the second preconfigured resource configuration is transmitted during an idle mode in which the wireless device does not have a connection with the wireless communication network or during an inactive mode in which the wireless device has an inactive connection with the wireless communication network.
44. The method of any of embodiments 29-43, wherein said transmitting or receiving user data is performed during an idle mode in which the wireless device does not have a connection with the wireless communication network or during an inactive mode in which the wireless device has an inactive connection with the wireless communication network.
45. The method of embodiment 44, wherein said transmitting or receiving user data is performed without the wireless device having performed a random access procedure since existing the connected mode and entering the idle mode or the inactive mode.
46. The method of embodiment 44, wherein said transmitting or receiving user data is performed without having received message 1 of a random access procedure, and/or transmitted message 2 of a random access procedure, since existing the connected mode and entering the idle mode or the inactive mode.
47. The method of any of embodiments 29-46, further comprising transmitting or receiving user data using non-recurring preconfigured resources during an idle mode or an inactive mode, without the wireless device having performed a random access procedure since existing the connected mode and entering the idle mode or the inactive mode, wherein the idle mode is a mode in which the wireless device does not have a connection with the wireless communication network or the inactive mode is a mode in which the wireless device has an inactive connection with the wireless communication network.
48. The method of any of embodiments 29-47, further comprising receiving user data using non-recurring preconfigured resources during an idle mode or an inactive mode, based on a timing advance transmitted the last time the wireless device was in a connected mode or transmitted during the idle mode or the active mode.
49. The method of any of embodiments 29-48, wherein said transmitting or receiving user data comprises receiving user data using the first preconfigured resource using a Message 3 format of a random access procedure or a radio resource control (RRC) connection request message.
50. The method of any of embodiments 29-48, wherein said transmitting or receiving user data comprises receiving user data using the first preconfigured resource using an early data transmission (EDT) Message 3 format of a random access procedure, an EDT RRC message, or a message format that is for or based on EDT.
51. The method of any of embodiments 29-50, wherein said transmitting or receiving user data comprises transmitting user data using the first preconfigured resource using a Message 4 format of a random access procedure or a radio resource control (RRC) connection setup message.
52. The method of any of embodiments 29-50, wherein said transmitting or receiving user data comprises transmitting user data using the first preconfigured resource using an early data transmission (EDT) Message 4 format of a random access procedure, an EDT RRC message, or a message format that is for or based on EDT.
53. The method of any of embodiments 29-52, wherein the control signaling indicating the first preconfigured resource configuration is dedicated control signaling.
54. The method of any of embodiments 29-53, wherein said transmitting or receiving user data using the first preconfigured resource is based on validity or reservation of the first preconfigured resource not having expired.
55. The method of any of embodiments 29-54, wherein the first preconfigured resource configuration is generic or agnostic as to whether the first preconfigured resource is a common resource or a dedicated resource.

BA. The method of any of the previous embodiments, wherein the first preconfigured resource is a non-recurring preconfigured resource.
BB. The method of any of the previous embodiments, wherein the second preconfigured resource is a non-recurring preconfigured resource.
BC. The method of any of the previous embodiments, further comprising:
obtaining user data: and
forwarding the user data to a host computer or a wireless device.

Group C Embodiments

C1. A wireless device configured to perform any of the steps of any of the Group A embodiments.
C2A. A wireless device comprising:
processing circuitry configured to perform any of the steps of any of the Group A embodiments; and
power supply circuitry configured to supply power to the wireless device.

C2B. A wireless device comprising:
communication circuitry; and
processing circuitry configured to perform any of the steps of any of the Group A embodiments.

C3. A wireless device comprising:
processing circuitry and memory, the memory containing instructions executable by the processing circuitry whereby the wireless device is configured to perform any of the steps of any of the Group A embodiments.

C4. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C5. A computer program comprising instructions which, when executed by at least one processor of a wireless device, causes the wireless device to carry out the steps of any of the Group A embodiments.

C6. A carrier containing the computer program of embodiment C5, wherein the carrier is one of an electronic signal, optical signal, radio signal, or computer readable storage medium.

C7. A radio network node configured to perform any of the steps of any of the Group B embodiments.

C8A. A radio network node comprising:
processing circuitry configured to perform any of the steps of any of the Group B embodiments;
power supply circuitry configured to supply power to the radio network node.

C8B. A radio network node comprising:
communication circuitry; and
processing circuitry configured to perform any of the steps of any of the Group B embodiments.

C9. A radio network node comprising:
processing circuitry and memory, the memory containing instructions executable by the processing circuitry whereby the radio network node is configured to perform any of the steps of any of the Group B embodiments.

C10. A computer program comprising instructions which, when executed by at least one processor of a radio network node, causes the radio network node to carry out the steps of any of the Group B embodiments.

C11. A carrier containing the computer program of embodiment C10, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE).
wherein the cellular network comprises a radio network node having a radio interface and processing circuitry, the radio network node's processing circuitry configured to perform any of the steps of any of the Group B embodiments.

D2. The communication system of the pervious embodiment further including the radio network node.

D3. The communication system of the previous 2 embodiments, further including the UE, wherein the UE is configured to communicate with the radio network node.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a radio network node and a user equipment (UE), the method comprising:
at the host computer, providing user data; and
at the host computer, initiating a transmission carrying the user data to the UE via a cellular network comprising the radio network node, wherein the radio network node performs any of the steps of any of the Group B embodiments.

D6. The method of the previous embodiment, further comprising, at the radio network node, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a radio network node, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes a radio network node configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a radio network node and a user equipment (UE), the method comprising:
at the host computer, providing user data; and
at the host computer, initiating a transmission carrying the user data to the UE via a cellular network comprising the radio network node, wherein the UE performs any of the steps of any of the Group A embodiments.

D13. The method of the previous embodiment, further comprising at the UE, receiving the user data from the radio network node.

D14. A communication system including a host computer comprising:
communication interface configured to receive user data originating from a transmission from a user equipment (UE) to a radio network node,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the radio network node, wherein the radio network node comprises a radio interface configured to communicate with the UE and a communication interface configured to forward to the host computer the user data carried by a transmission from the UE to the radio network node.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a radio network node and a user equipment (UE), the method comprising:
at the host computer, receiving user data transmitted to the radio network node from the UE, wherein the UE performs any of the steps of any of the Group A embodiments.

D20. The method of the previous embodiment, further comprising, at the UE, providing the user data to the radio network node.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a radio network node, wherein the radio network node comprises a radio interface and processing circuitry, the radio network node's processing circuitry configured to perform any of the steps of any of the Group B embodiments.

D24. The communication system of the previous embodiment further including the radio network node.

D25. The communication system of the previous 2 embodiments, further including the UE, wherein the UE is configured to communicate with the radio network node.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a radio network node and a user equipment (UE), the method comprising:
at the host computer, receiving, from the radio network node, user data originating from a transmission which the radio network node has received from the UE, wherein the UE performs any of the steps of any of the Group A embodiments.

D28. The method of the previous embodiment, further comprising at the radio network node, receiving the user data from the UE.

D29. The method of the previous 2 embodiments, further comprising at the radio network node, initiating a transmission of the received user data to the host computer.

APPENDIX A

Title: Support for Transmission in Preconfigured UL Resources
One objective is to specify the following improvement for machine-type communications for BL/CE UEs:

---

Improved UL transmission efficiency and/or UE power consumption:

---

Specify support for transmission in preconfigured resources in idle and/or connected mode based on SC-FDMA waveform for UEs with a valid timing advance [RAN1, RAN2, RAN4]

Both shared resources and dedicated resources can be discussed

Note: This is limited to orthogonal (multi) access schemes

Idle mode based pre-configured UL resources is supported for UEs in possession of a valid TA
FFS: Validation mechanism for TA
FFS: How the pre-configured UL resources is acquired
For transmission in preconfigured UL resources, the UE may use the latest TA of which its validity can be confirmed
Study both shared and dedicated resource for preconfigured UL resources. If both shared and dedicated resources are supported, strive for commonality in design of both resource types.
HARQ procedures for transmission in preconfigured UL resources should be studied and the following aspects should be considered:
Whether to support HARQ;
If supported, details of HARQ design including the number of HARQ processes;
Whether ACK/NACK is necessary
Fallback mechanisms should be considered, e.g. fallback to legacy RACH/EDT procedures.

This appendix assesses the support of transmissions in pre-configured UL resources, while keeping compliant with the agreements and maintaining the specs impacts and implementation complexity minimized.

Transmission on Pre-Configured UL Resources (PUR) in IDLE Mode:

"Idle mode based pre-configured UL resources is supported for UEs in possession of a valid TA", which includes two actions for further study "FFS: Validation mechanism for TA" and "FFS: How the pre-configured UL resources is acquired". The subsections below provide a potential framework for transmitting on pre-configured UL resources in IDLE mode, which fulfils the WI objective while keeping the implementation and specification impacts minimized for RAN1 and other Working Groups.

Two-Step PUR Transmission in IDLE Mode:

To be able to transmit on pre-configured UL resources in IDLE mode, the UE has to have acquired an initial Timing Advance (TA) and guaranteeing that it is still valid by the time the transmission on pre-configured UL is intended to be performed. The initial timing advance command (which represents the total distance between the UE and the cell) is signalled in the random-access response. Thereafter, once the UE has entered into connected mode, the TA can be adjusted by advancing or delaying the uplink transmission timing.

The above indicates that the first step for a UE that intends to transmit in pre-configured UL resources is to acquire an initial TA, which can be obtained by following the legacy connection establishment. As a second step, and for later occasions in IDLE mode, the UE might benefit from transmitting on pre-configured UL resources if the network has authorized it to do so and the TA it holds is still deemed to be valid. Moreover, to give an answer on the "FFS: How the pre-configured UL resources is acquired", it is necessary to determine the traffic type that it is intended to be assessed by the transmissions over PUR. Depending on it, the PUR uplink resources could for example be acquired periodically or on an on-demand basis.

Figure 20:
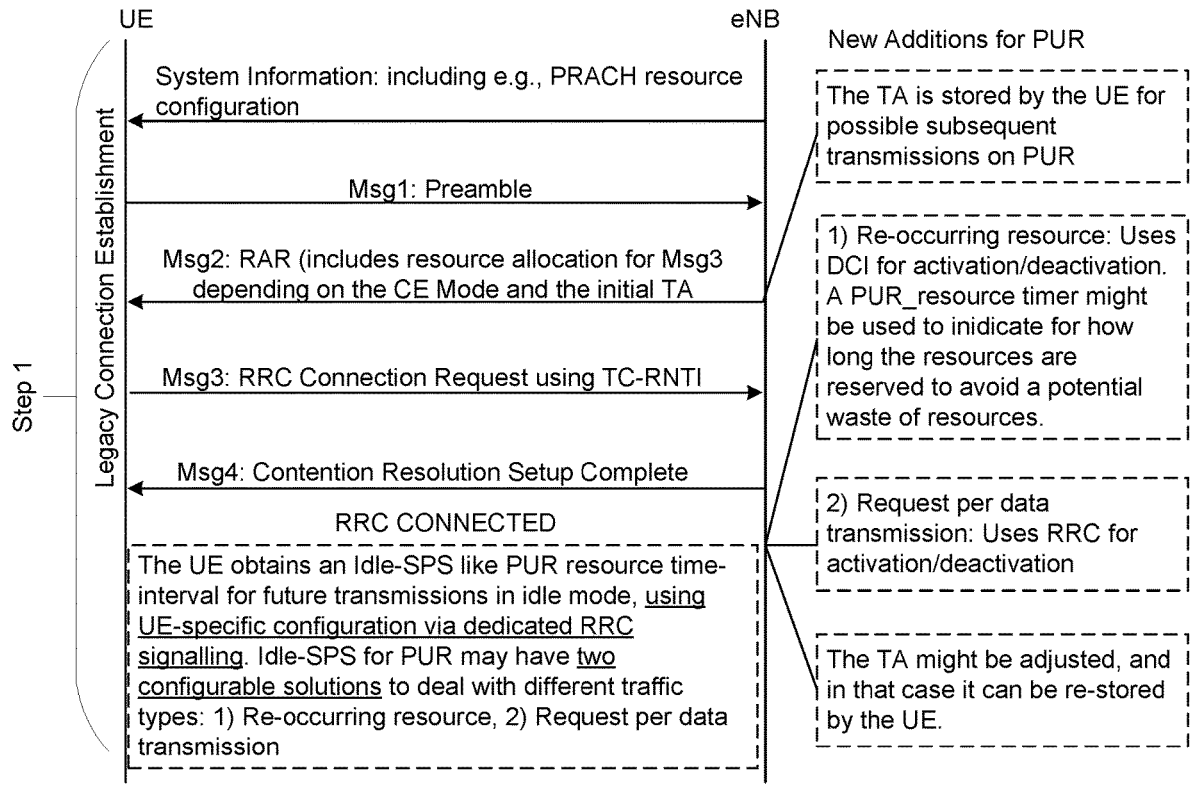
FIG. 20 illustrates a two-step scheme for PUR transmission in idle mode.
Figure 20:
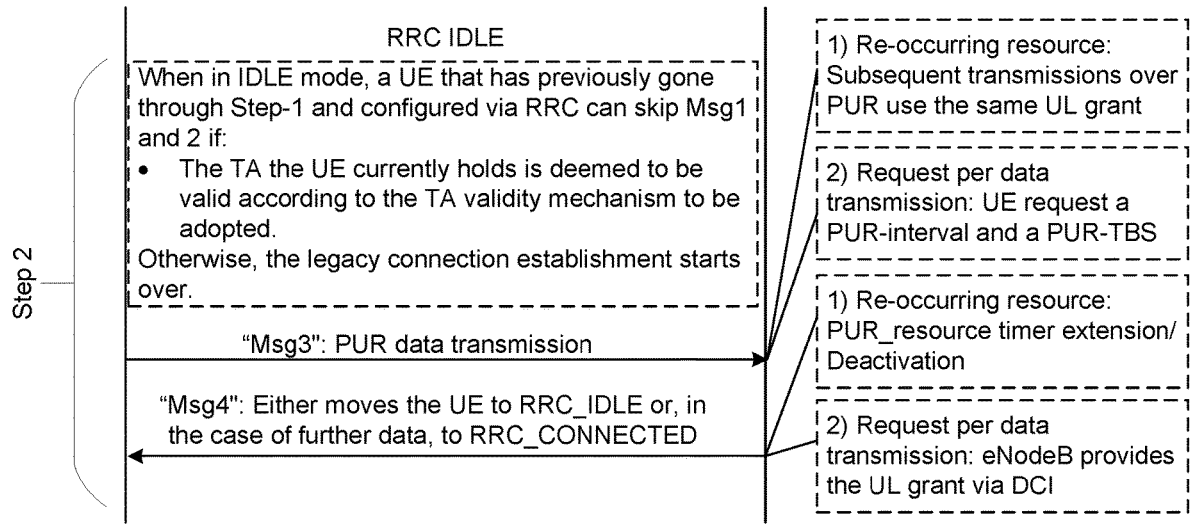

FIG. 20 provides an example of a Two-step PUR transmission in IDLE mode, which is composed by the legacy sequence for initial access followed by a PUR configuration in connected mode, plus the actual PUR transmission in idle mode.

Step-1: Initial TA Acquisition and Pre-Configuration of UL Resources.

The legacy connection establishment is re-used. From Msg2, the initial TA is stored to be used for possible subsequent transmissions on pre-configured UL resources.

In RRC CONNECTED, The UE obtains an Idle-SPS like PUR configuration via dedicated RRC signaling which may consist of two configurable options depending on traffic type intended to be served:

Re-occurring resource: This option would be used when dealing with deterministic traffic, since the pre-configured UL resource would be available on a periodic-basis.
DCI for activation/deactivation would be used.
A timer indicating for how long time the resources are reserved can be used, this is to avoid a potential waste of resources (e.g., in case the UE abandons the cell)

Request per data transmission: This other option would be used when dealing with no regular traffic, in which case the pre-configured UL resource would made available on a per request-basis.

Note: While in connected mode the TA might be adjusted, in that case it can be re-stored by the UE.

Step-2: PUR Validation and Transmission on Pre-Configured UL Resources

When in IDLE mode, a UE that has previously gone through Step-1 can directly transmit data in Msg3 (i.e., Msg1 and Msg2 are skipped) if:
The UE in IDLE mode has been authorized to transmit data in pre-configured UL resources.
The TA the UE currently holds is deemed to be valid after testing it by using any of the TA validity mechanisms to be adopted by RAN1.
The PUR timer has not expired yet, this in case of the re-occurring resource approach.
Otherwise, the legacy sequence for initial access starts over.

The UE transmits PUR related data in "Msg3".
Re-occurring resource: For subsequent transmissions over PUR, the same UL grant is used recurrently.
Request per data transmission: For a subsequent transmission over PUR, the UE request an UL grant (e.g., including PUR-interval and PUR-TBS)

eNB receives "Msg3" and either moves the UE to RRC_IDLE or, in the case of further data, to RRC_CONNECTED by "Msg4".
Re-occurring resource: The timer used to maintain the UL resources for PUR gets extended, and there is also a possibility of deactivating the re-occurring usage of resources from this message.
Request per data transmission: The eNodeB provides the UL grant via DCI.

The advantage of following a two-step approach for transmitting in pre-configured uplink resources is that the legacy connection establishment would be re-used, while the actual PUR transmission would benefit from signalling load reductions, power savings and a reduced latency by transmitting directly on "Msg3" of an EDT-like framework, which would help to minimize the impact in RAN1 and other Working Groups (e.g., the EDT security aspects could be inherited).

As a summary the two steps may be performed as follows:

In a first step the legacy connection establishment is re-used to acquire the initial TA, and to get a pre-configuration of UL resources which might be used by the UE in future idle mode transmissions.

In a second step, after evaluating and fulfilling some criteria (including TA validity) the UE might perform an IDLE mode transmission on pre-configured UL resources directly on Msg3 (i.e., skipping Msg1 and Msg2) by using either a periodic or an on-demand approach.

Performing a PUR transmission directly on Msg3 (i.e., skipping Msg1 and Msg2) would provide signalling load reductions, power savings and a reduced latency, while using an EDT-like frame work to achieve it would help to minimize the impact in RAN1 and other Working Groups.

The two-step PUR transmission scheme for idle-mode can serve either dedicated or shared uplink transmissions. For example, the UL grant design for transmissions over PUR could re-use a sub-PRB allocation to increase the spectral efficiency, in which case up four UEs could share the same PRB. Moreover, HARQ retransmissions could be also supported by re-using the corresponding fields (e.g., HARQ process number, new data indicator) in the DCI used by sub-PRB.

TA Validity Mechanisms:

The support of transmissions on pre-configured UL resources in IDLE mode is tied to the condition of being in possession of a valid TA. Thus, once an initial TA has been acquired and thereafter retained by a UE that has stayed or moved back to IDLE mode, there needs to be a mechanism that can be used to determine the validity of such a TA at the moment an IDLE mode transmission on pre-configured UL resources is intended to be performed.

RSRP/RSRQ Based TA Validity Mechanism:

For stationary or low mobility devices a limited change in idle mode serving and neighbour cells signal strength can be expected. Hence, a possible way of determining the validity of a retained TA configuration can be based on identifying the large variations on the idle mode serving and neighbour cells signal strength (RSRP) and quality measurements (RSRQ).

For example, when the UE acquires the initial TA at time instance $T_0$, it measures the downlink signal strength RSRP($T_0$) and compares it to a configured threshold $RSRP_{TH}$. If $RSRP(T_0) > RSRP_{TH}$ the device takes this is an indication that it is in proximity to the base station. At a second-time instance $T_1$, the higher layers in the device triggers an idle mode data transmission, and the device again measures the absolute signal strength $RSRP(T_1)$ of the serving cell to compare it against threshold $RSRP_{TH}$. If $RSRP(T_1) > RSRP_{TH}$ the device takes this is an indication that it is still in proximity to the base station and assumes that the stored $TA(T_0)$ value, is still valid.

Another possibility could be that the device calculates the change $RSRP(T_1) - RSRP(T_0)$ in signal strength in the serving cell prior to transmitting idle mode data. The change in the value would be seen as an indication of mobility. If $RSRP(T_1) - RSRP(T_0)$ is below a configured threshold, the device may assume that its TA(T0) value stored at time instance $T_0$ is still valid, and that can be used to perform an idle mode data transmission.

TDOA Based TA Validity Mechanism:

A device that is stationary, or of low mobility, can be expected to experience a limited change in the time difference of arrival (TDOA) of two or more reference signals received from two or more base stations.

Figure 21:
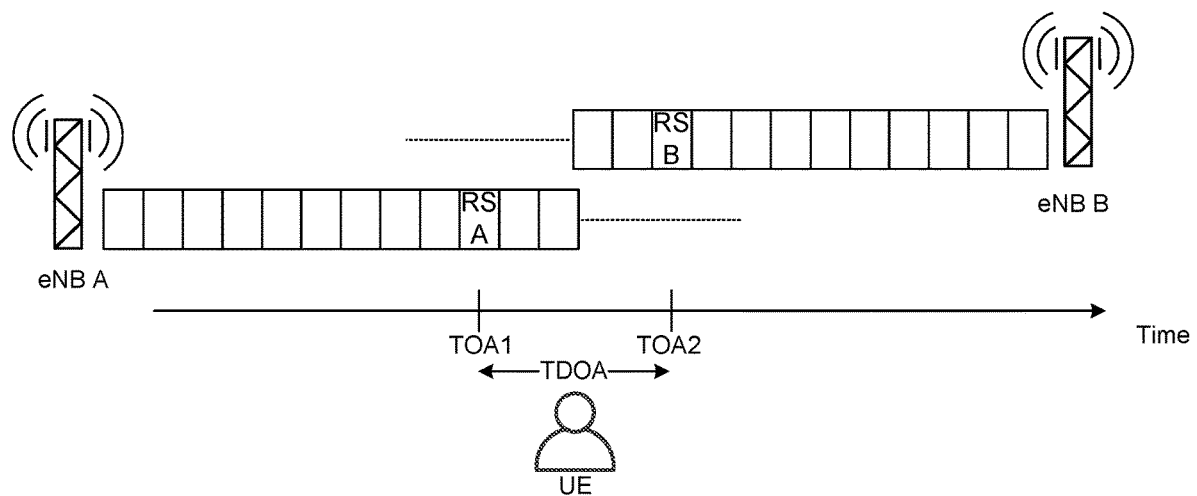
FIG. 21 illustrates a Time-Difference-Of-Arrival reception of reference signals transmitted from two base stations.

FIG. 21 illustrates a UE that receives reference signals (RS) A and B transmitted from base stations eNB A and B. Based on the time of arrival (TOA) of each of these reference signals the UE can compute the TDOA between the two reference signals. As each of the TOAs corresponds to the distance between the base station and UE, the TDOA may serve as a strong indicator of mobility. A time variant TDOA indicates mobility, while a time invariant TDOA indicates low or no mobility.

Cell-Radius Based TA Validity Mechanism:

The amount of timing error tolerance provided by the cyclic prefix along with knowing the serving cell's radius can be used to determine the validity of a TA. Recall that 1 step $T_A$ is equal to $16T_s=0.52$ us, which translated to meters is around $((16T_s)(300000000))/2=78$ m.

For example, in the case of a small cell deployment, when a normal cyclic prefix has been configured (i.e., CP length 4.7 us) and the cell radius happens to be Y=700 meters, the TA value that the UE currently holds can be considered to be valid if it is less than a threshold X=8, which corresponds to ~624 m (The computation of the threshold can be generalized for any cell radius as follows floor(Y/((16 Ts c)/2))).

The above prevents that UEs located near the cell edge on spotty coverage areas transmit in uplink with outdated/incorrect TA values.

TA-History Based TA Validity Mechanism:

It might be possible to determine the TA validity based on previously assigned TA. For example, the eNodeB and/or UE can keep tracking of previous TA values assigned to a particular UE, and based on how often the TA values were updated, the eNodeB can understand whether the UE is stationary or a semi-stationary device. This information can then be used to determine whether the UE is allowed to apply some TA values directly next time it intends to transmit UL data in idle mode without having to acquire a new TA value.

To be more specific, if the TA value that the eNB estimated and assigned to a UE has not been changed for a predetermined time (e.g, can be tens of minutes, several hours or even several days), the eNB and/or network can (temporally) identify the UE as a (semi-)stationary UE, and can assign to it a TA value with long term validity time.

Timer Based TA Validity Mechanism:

Once the UE obtains a TA, the eNodeB provides a configurable timer (Time Alignment Timer) that can be UE-specific or cell-specific, which is used to control for how long the UE is considered to be uplink time aligned. Similarly, a Time Alignment Timer for idle mode can be introduced, for example in combination with some other TA validity mechanism aiming at providing a periodic TA refresh.

APPENDIX B

Title: Support for Transmission in Preconfigured UL Resources

The appendix concerns improving the uplink transmission efficiency and/or UE power consumption by means of transmission in preconfigured resources:

Improved UL Transmission Efficiency and/or UE Power Consumption:
Specify support for transmission in preconfigured resources in idle and/or connected mode based on SC-FDMA waveform for UEs with a valid timing advance[RAN1, RAN2, RAN4]
Both shared resources and dedicated resources can be discussed
Note: This is limited to orthogonal (multi) access schemes UE's TA will be valid or not when it returns. Therefore, and since the UE will be in RRC_IDLE, there will be a need for requirements on the UE. That is, the UE should fulfil certain conditions to check that the TA is valid before PUR access.

The UE must fulfil certain requirements to ensure its Timing Advance is valid before accessing preconfigured uplink resources.

Furthermore, again based on legacy operation, the UE must transmit at least once in the UL in order to be assigned

---

Idle mode based pre-configured UL resources is supported for UEs in possession of a valid TA
FFS: Validation mechanism for TA
FFS: How the pre-configured UL resources is acquired
For transmission in preconfigured UL resources, the UE may use the latest TA of which its validity can be confirmed
Study both shared and dedicated resource for preconfigured UL resources. If both shared and dedicated resources are supported, strive for commonality in design of both resource types.
HARQ procedures for transmission in preconfigured UL resources should be studied and the following aspects should be considered:
Whether to support HARQ;
If supported, details of HARQ design including the number of HARQ processes;
Whether ACK/NACK is necessary
Fallback mechanisms should be considered, e.g. fallback to legacy RACH/EDT procedures.

---

Due to massive MTC characteristic of small infrequent data, we believe preconfigured uplink resources (PUR) to be most relevant and beneficial in RRC_IDLE. Therefore, there continued discussion is for Idle-PUR unless otherwise mentioned. Connected-PUR is discussed below. Further, the use case of uplink reporting is considered in the discussion below.
the UE is allowed to use PUR "with a valid timing advance". In legacy operation, in Msg2 the UE obtains the Timing Advance (TA) to apply for uplink transmissions to be received in sync (Timing Advance Command in RAR, see TS 36.321). The eNB configures the UE with a timer during which it should consider the timing advance to be valid (timeAlignmentTimer in MAC-MainConfig in TS 36.331), and after the expiration of this timer the UE must again perform random access to obtain a new Timing Advance. Since it is stated that the UE must have a valid TA for Rel-16 PUR, there are two options: 1) the UE is stationary enough to reuse its previous TA, i.e. moving within the length of the cyclic prefix, or 2) the UE moves but constantly updates TA to keep it valid. For option 2) to work, signaling is required. E.g. triggering a random access whenever the UE has moved more than what can be covered by the cyclic prefix. In any way uplink transmissions are required, which has a negative impact on the two KPIs the WI-objective tries to improve: UL transmission efficiency and UE power consumption.

Maintaining a valid Timing Advance for mobile UEs in RRC_IDLE is not feasible.

Transmission in preconfigured uplink resources in RRC_IDLE is limited to UEs which can reuse their Timing Advance from previous transmission.

For legacy operation, eNB can base the length of the timeAlignmentTimer on the UEs speed, cell size, etc. Moreover, low mobility UEs will not move very far during the relatively short time in RRC_CONNECTED. For PUR, however, the UE can be in RRC_IDLE for several hours and then return to transmit. A timer-based solution is then not sufficient since eNB has no means to estimate whether the UE's TA will be valid or not when it returns. Therefore, and since the UE will be in RRC_IDLE, there will be a need for requirements on the UE. That is, the UE should fulfil certain conditions to check that the TA is valid before PUR access.

The UE must fulfil certain requirements to ensure its Timing Advance is valid before accessing preconfigured uplink resources.

Furthermore, again based on legacy operation, the UE must transmit at least once in the UL in order to be assigned a TA. That is, in practice PUR will not be applicable for the initial transmission in a cell.

Since the UE must obtain the Timing Advance, transmission in preconfigured uplink resources is not possible for the initial transmission in a cell.

Therefore, a legacy transmission is required for the initial data transmission and the most straight forward solution is to configure PUR via dedicated RRC signalling.

Transmission in preconfigured uplink resources is configured by dedicated RRC signalling.

For the actual data transmission there are potentially a lot of RAN2 open issues. If in general RAN1 agrees on some new physical channel for PUR transmission (potentially supporting only smaller TBSs), RAN2 needs to ensure a solution with working data addressing/routing, working retransmissions, potentially contention resolution, security, etc. This could require a lot of RAN2 work and all protocol layers would have to be looked at; MAC, RLC, PDCP, etc.

Transmission in preconfigured uplink resources could potentially have a lot of RAN2 impact.

However, the data transmission could reuse a lot of work from Rel-15 EDT, where all these issues have been solved. That is, for both solutions considered below, the data transmission part could be done similar to the EDT data transmission in Msg3. Potentially RAN2 could also consider reusing the EDT Msg3 and Msg4 RRC messages or use them as a baseline for new PUR RRC messages. This would resolve all the open issues described above.

Rel-15 EDT Msg3/Msg4 data transmission is used as baseline for transmission in preconfigured uplink resources.
Contention-Free or Contention-Based Data Transmission:

For RAN2 it does not matter if the PUR resource the UE is configured with is a dedicated or shared radio resource. For example, the UE can be assigned a UE-specific code for CDMA in a shared resource. What matters however is if the PUR data transmission is contention-based or contention-free.
Contention-Based PUR:

For contention-based PUR, as illustrated in FIG. 18, the UE would be given a common PUR configuration and TA in the initial access. These common PUR could be selected by any UE and transmitting data there would be at the risk of collision. The configuration is perhaps most motivated as periodic resources, much like how PRACH is configured. In a similar way different CE-levels would have to be supported, and in addition several TBSs, which may make this solution very resource consuming.

Upon data arrival, the UE would select the subsequent periodic PUR to transmit its data. No knowledge of UE predicted traffic would be required. However, transmissions would be performed at the risk of collision, and if no improvements are done at the PHY-layer the collision risk is x64 or x48 compared to legacy for LTE-M and NB-IoT, respectively, due to the lack of preamble selection. If it cannot be ensured that the collision risk is lower than for the legacy procedure (i.e. compared to EDT), common-PUR could perform worse than legacy. If so, it is very hard to motive contention-based PUR. Further, according to legacy procedure, the HARQ retransmissions would not be possible in this case since eNB cannot do soft-combining. I.e. there is no possibility to schedule a retransmission or, if the subsequent common-PUR resource is used, to know that it is a retransmission or not.

Since the resources are to be used by any UE, there is no possibility to make use of higher UE capabilities unless the PUR feature is limited to those UEs. Due to this fact, Contention-based PUR is perhaps most well suited for use-cases with sporadic traffic were most often nothing is being transmitted, such as alarms etc. Even then uplink efficiency gains are highly questionable, but UEs would have somewhat reduced power consumption since Msg1 and Msg2 can be omitted. Whether that reduction is noticeable when there is most often no transmission remains to be seen.

Thus, contention-based transmission in preconfigured uplink resources may be justified by use-cases with sporadic and rare transmissions, such as alarms etc.

For contention-free PUR, as illustrated in FIG. 17, the UE would be given a dedicated PUR resource and TA in the initial access. The PUR resource could be configured tailor-made to the UEs traffic profile, capabilities and CE-level. In addition, the PUR transmission would be guaranteed to be collision free. Therefore, as long as the configured resources are used, gains in both uplink transmission efficiency and UE power consumption would be ensured.

A potential problem is the configuration of dedicated radio resources to UEs in RRC_IDLE mode. That is, eNB does not normally keep track of UEs in RRC_IDLE mode and reserving radio resources for UEs that might no longer be in the cell would rather degrade UL transmission efficiency than to improve it since resources would be wasted. However, there is no reason why periodic resource would have to be reserved. Dedicated-PUR resources could be reserved for one PUR transmission at the time. I.e., only one PUR resource allocated, and later upon that transmission resources are reserved for the next PUR transmission, and so on. This would greatly limit the potential resource waste and make the feature useful to more those use-cases with periodic traffic. Alternatively, the resource reservation could be timer based. There may be the following advantages for dedicated preconfigured uplink resources: Less resource waste, resources assigned only when needed; Adaptive to UE, no additional resource waste from multiple CE-levels, TBSs, etc.; Collision free→guaranteed gains for both UE power consumption & UL Tx efficiency; UE-specific higher data rates possible (i.e. gains from capabilities such as multi-tone, Cat-M2/Cat-NB2, etc.); HARQ retransmissions.

Thus, contention-free PUR is may be regarded a good solution due to less system overhead and guaranteed gains according to the WI-objective.

Thus, transmission in preconfigured uplink resources is supported in RRC_IDLE in dedicated resources.

For dedicated-PUR some UE-specific parameters would have to be configured over dedicated RRC signalling. These would for example be the PUR interval (i.e. resource time offset), the PUR TBS, any allocation information for the PUR resource, etc. As described above there is big potential benefit with assigning only one PUR resource at the time, and the same principle as for Rel-12 power saving mode (PSM) could be applied. That is, per uplink transmission the UE would request a PUR-interval and PUR-TBS, and the network reply with the configuration parameters the UE should apply. This automatically reduces the resource waste since at most one transmission occasions is wasted if the UE leaves the cell or for other reasons do not transmit in the PUR resource. Further, it is more adaptive if either the TBS or interval should change. The drawback is, of course, the signalling overhead if the interval and TBS should always be the same for some UE. This could however easily be solved by a flag stating that the same interval and TBS as last time should be applied.

Thus, dedicated transmission in preconfigured uplink resources is configured for one transmission occasion at the time.

As illustrated, the UE would be configured during an RRC Connection (or EDT transmission). Both eNB and UE would need to have a common understanding of when the subsequent transmission will occur.

Thus, interval (time resource offset) and TBS are used as configuration parameters for dedicated transmission in pre-configured uplink resources.

The network would then need to store these parameters when the UE moves to RRC_IDLE. For the CIoT UP-solution (RRC Suspend/Resume), this would mean adding the PUR parameters to the stored UE context. For the CIoT CP-solution (DoNAS), this would mean adding the PUR parameters to the stored UE context in MME. Further, it must also be ensured that the scheduler is aware of all these PUR occasions.

Thus, configuration parameters for preconfigured uplink resources are added to the UE-context.

Above, PUR in RRC_IDLE has been discussed but the WI-objective potentially also includes PUR in RRC_CONNECTED. First, consider common-PUR in Connected. The UE has gone through the random access procedure to obtain a connection and dedicated radio resources for transmission. To then transmit data in common resources at the risk of collision and retransmission is less efficient than to trigger a Scheduling Request.

Dedicated-PUR in Connected, on the other hand, would be very similar to SPS. Note that LTE-M already has support for SPS, whereas for NB-IoT no strong need was seen in Rel-15 and SPS support Rel-15 was only introduced for BSR. However, since massive MTC traffic is not perfectly periodic on subframe-level, like VoIP that SPS was originally introduced for, there would still be a need for some PUR modifications of SPS. For example, the configuration of one PUR resource at the time as discussed above for Idle mode.

Transmission in preconfigured uplink resources in RRC_CONNECTED is considered in dedicated resources (contention-free) but not in common resources (contention-based).

In FIG. 16 an example of a signaling diagram for PUR configuration is given. Note that this is assuming a legacy connection establishment procedure for the initial access in the cell, but as an optimization it may be applicable with EDT as well.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

BI Backoff Indicator
BSR Buffer Status Report
Cat-M1 Category M1
Cat-M2 Category M2
CE Coverage Enhanced/Enhancement
DL Downlink
eMTC enhanced Machine-Type Communications
eNB Evolved NodeB
EDT Early Data Transmission
IoT Internet of Things
LTE Long-Term Evolution
MAC Medium Access Control
NAS Non-Access Stratum
NB-IoT Narrowband Internet of Things
M2M Machine-to-Machine
MTC Machine-Typ Communications
PDU Protocol Data Unit
PUR Preconfigured Uplink Resources
(N)PRACH (Narrowband) Physical Random Access Channel
PRB Physical Resource Block
RA Random Access
RAPID Random Access Preamble IDentifier
RAR Random Access Response
RNTI Radio Network Temporary Identifier
RRC Radio Resource Control (protocol)
TBS Transport Block Size
UE User Equipment
UL Uplink
WI Work Item
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method performed by a wireless device configured for use in a wireless communication network, the method comprising:
   transmitting, in an uplink message, a request for a preconfigured uplink resource configuration;
   receiving, during a connected mode in which the wireless device has a connection with the wireless communication network, control signaling indicating a first preconfigured resource configuration that configures a first preconfigured resource, wherein the first preconfigured resource is a non-recurring preconfigured resource dedicated to the wireless device;
   transmitting user data using the first preconfigured resource;
   in conjunction with transmitting data using the first preconfigured resource, requesting a second preconfigured resource configuration; and
   receiving control signaling indicating a second preconfigured resource configuration that configures a second preconfigured resource, wherein the second preconfigured resource is a non-recurring preconfigured resource dedicated to the wireless device.

2. The method of claim 1, wherein said request is a 1-bit field.

3. The method of claim 1, wherein said request includes one or more preferred parameters for the preconfigured uplink resource configuration.

4. The method of claim 1, wherein said requesting comprises transmitting a request for the second preconfigured resource configuration, wherein the request for the second preconfigured resource configuration is included in the same message as the user data transmitted using the first preconfigured resource.

5. The method of claim 1, wherein said requesting comprises transmitting a request for the second preconfigured resource configuration, wherein the request for the second preconfigured resource configuration requests that the second preconfigured resource configuration be the same as the first preconfigured resource configuration or that one or more configuration parameters of the second preconfigured resource configuration be the same as one or more configuration parameters of the first preconfigured resource configuration.

6. The method of claim 1, wherein the control signaling indicating the second preconfigured resource configuration indicates that one or more configuration parameters of the second preconfigured resource configuration is the same as one or more configuration parameters of the first preconfigured resource configuration.

7. The method of claim 1, wherein the second preconfigured resource is the same as the first preconfigured resource except that the second preconfigured resource occurs later in time.

8. The method of claim 1, wherein the control signaling indicating the second preconfigured resource configuration is a 1-bit field.

9. The method of claim 1, wherein the method further comprises receiving a timing advance as part of transitioning to, or during, the connected mode, and wherein transmitting the user data is performed using said timing advance.

10. The method of claim 1, wherein the control signaling indicating the second preconfigured resource configuration also indicates a timing advance for transmitting user data using the second preconfigured resource.

11. The method of claim 10, wherein transmitting user data using the second preconfigured resource is performed during an idle mode in which the wireless device does not have a connection with the wireless communication network or during an inactive mode in which the wireless device has an inactive connection with the wireless communication network.

12. The method of claim 1, wherein said transmitting user data is performed during an idle mode in which the wireless device does not have a connection with the wireless communication network or during an inactive mode in which the wireless device has an inactive connection with the wireless communication network.

13. The method of claim 1, further comprising transmitting or receiving user data using non-recurring preconfigured resources during an idle mode or an inactive mode, without having performed a random access procedure since exiting the connected mode and entering the idle mode or the inactive mode, wherein the idle mode is a mode in which the wireless device does not have a connection with the wireless communication network or the inactive mode is a mode in which the wireless device has an inactive connection with the wireless communication network.

14. The method of claim 1, further comprising transmitting user data using non-recurring preconfigured resources during an idle mode or an inactive mode, using a timing advance received the last time the wireless device was in a connected mode or received during the idle mode or the active mode.

15. The method of claim 1, wherein said transmitting user data comprises:
- transmitting user data using the first preconfigured resource using a Message 3 format of a random access procedure or a radio resource control (RRC) connection request message; or
- transmitting user data using the first preconfigured resource using an early data transmission (EDT) Message 3 format of a random access procedure, an EDT RRC message, or a message format that is for or based on EDT.

16. A method performed by a radio network node configured for use in a wireless communication network, the method comprising:
- receiving from a wireless device, in an uplink message, a request for a preconfigured uplink resource configuration;
- transmitting, during a connected mode in which a wireless device has a connection with the wireless communication network, control signaling indicating a first preconfigured resource configuration that configures a first preconfigured resource, wherein the first preconfigured resource is a non-recurring preconfigured resource dedicated to the wireless device;
- receiving user data using the first preconfigured resource;
- in conjunction with receiving data using the first preconfigured resource, receiving a request for a second preconfigured resource configuration; and
- transmitting control signaling indicating a second preconfigured resource configuration that configures a second preconfigured resource, wherein the second preconfigured resource is a non-recurring preconfigured resource dedicated to the wireless device.

17. The method of claim 16, wherein said request is a 1-bit field.

18. The method of claim 16, wherein said request includes one or more preferred parameters for the preconfigured uplink resource configuration.

19. The method of claim 16, wherein the request for the second preconfigured resource configuration is included in the same message as the user data received using the first preconfigured resource.

20. The method of claim 16, wherein the request for the second preconfigured resource configuration requests that the second preconfigured resource configuration be the same as the first preconfigured resource configuration or that one or more configuration parameters of the second preconfigured resource configuration be the same as one or more configuration parameters of the first preconfigured resource configuration.

21. The method of claim 16, wherein the control signaling indicating the second preconfigured resource configuration indicates that one or more configuration parameters of the second preconfigured resource configuration is the same as one or more configuration parameters of the first preconfigured resource configuration.

22. The method of claim 16, wherein the second preconfigured resource is the same as the first preconfigured resource except that the second preconfigured resource occurs later in time.

23. The method of claim 16, wherein the control signaling indicating the second preconfigured resource configuration is a 1-bit field.

24. The method of claim 16, wherein the method further comprises transmitting a timing advance as part of the wireless device transitioning to, or during, the connected mode, and wherein receiving the user data is performed without having transmitting another timing advance to the wireless device.

25. The method of claim 16, wherein the control signaling indicating the second preconfigured resource configuration is transmitted during an idle mode in which the wireless device does not have a connection with the wireless communication network or during an inactive mode in which the wireless device has an inactive connection with the wireless communication network.

26. The method of claim 16, further comprising transmitting or receiving user data using non-recurring preconfigured resources during an idle mode or an inactive mode, without the wireless device having performed a random access procedure since exiting the connected mode and entering the idle mode or the inactive mode, wherein the idle mode is a mode in which the wireless device does not have a connection with the wireless communication network or the inactive mode is a mode in which the wireless device has an inactive connection with the wireless communication network.

27. The method of claim 16, further comprising receiving user data using non-recurring preconfigured resources during an idle mode or an inactive mode, based on a timing advance transmitted the last time the wireless device was in a connected mode or transmitted during the idle mode or the active mode.

28. The method of claim 16, wherein said receiving user data comprises:
- receiving user data using the first preconfigured resource using a Message 3 format of a random access procedure or a radio resource control (RRC) connection request message; or
- receiving user data using the first preconfigured resource using an early data transmission (EDT) Message 3 format of a random access procedure, an EDT RRC message, or a message format that is for or based on EDT.

29. A wireless device, the wireless device comprising:
communication circuitry configured for communication with a network; and
processing circuitry operatively coupled to the communication circuitry and configured to:
- transmit, in an uplink message, a request for a preconfigured uplink resource configuration;
- receive, during a connected mode in which the wireless device has a connection with the wireless communication network, control signaling indicating a first preconfigured resource configuration that configures a first preconfigured resource, wherein the first preconfigured resource is a non-recurring preconfigured resource dedicated to the wireless device;
- transmit user data using the first preconfigured resource;
- request a second preconfigured resource configuration in conjunction with transmitting data using the first preconfigured resource; and
- receive control signaling indicating a second preconfigured resource configuration that configures a second preconfigured resource, wherein the second preconfigured resource is a non-recurring preconfigured resource dedicated to the wireless device.

30. A network node, the network node comprising:
communication circuitry configured for communication with a network; and
processing circuitry operatively coupled to the communication circuitry and configured to:
- receive from a wireless device, in an uplink message, a request for a preconfigured uplink resource configuration;

transmit, during a connected mode in which a wireless device has a connection with the wireless communication network, control signaling indicating a first preconfigured resource configuration that configures a first preconfigured resource, wherein the first preconfigured resource is a non-recurring preconfigured resource dedicated to the wireless device; and receive user data using the first preconfigured resource;

receive a request for a second preconfigured resource configuration in conjunction with receiving data using the first preconfigured resource; and transmit control signaling indicating a second preconfigured resource configuration that configures a second preconfigured resource, wherein the second preconfigured resource is a non-recurring preconfigured resource dedicated to the wireless device.

31. The method of claim 1, wherein the control signaling is received in response to the request for the preconfigured uplink resource configuration, wherein transmitting user data using the first preconfigured resource comprises transmitting user data using the first preconfigured resource during an idle mode in which the wireless device does not have a connection with the wireless communication network or during an inactive mode in which the wireless device has an inactive connection with the wireless communication network, wherein said requesting comprises transmitting a request for the second preconfigured resource configuration, wherein the request for the second preconfigured resource configuration is included in the same message as the user data transmitted using the first preconfigured resource, and wherein the method further comprises transmitting user data using the second preconfigured resource during the idle mode or the inactive mode, without having performed a random access procedure since transmitting user data using the first preconfigured resource.

32. The wireless device of claim 29, wherein the processing circuitry is configured to:

receive the control signaling in response to the request for the preconfigured uplink resource configuration;

transmit user data using the first preconfigured resource by transmitting user data using the first preconfigured resource during an idle mode in which the wireless device does not have a connection with the wireless communication network or during an inactive mode in which the wireless device has an inactive connection with the wireless communication network;

request the second preconfigured resource configuration by transmitting a request for the second preconfigured resource configuration, wherein the request for the second preconfigured resource configuration is included in the same message as the user data transmitted using the first preconfigured resource; and transmit user data using the second preconfigured resource during the idle mode or the inactive mode, without having performed a random access procedure since transmitting user data using the first preconfigured resource.

\* \* \* \* \*